(12) United States Patent
Daughtery, III

(10) Patent No.: US 7,024,384 B2
(45) Date of Patent: *Apr. 4, 2006

(54) APPARATUS AND PROCESS FOR CALCULATING AN OPTION

(76) Inventor: Vergil L. Daughtery, III, 203 Forest Cir., Americus, GA (US) 31709-3337

( * ) Notice: Subject to any disclaimer, the term of this patent is extended or adjusted under 35 U.S.C. 154(b) by 0 days.

This patent is subject to a terminal disclaimer.

(21) Appl. No.: 09/906,305

(22) Filed: Jul. 16, 2001

(65) Prior Publication Data

US 2001/0056392 A1    Dec. 27, 2001

Related U.S. Application Data

(63) Continuation of application No. 09/262,663, filed on Mar. 4, 1999, now Pat. No. 6,263,321, which is a continuation-in-part of application No. 08/718,630, filed on Sep. 17, 1996, now Pat. No. 5,884,286, which is a continuation-in-part of application No. 08/282,717, filed on Jul. 29, 1994, now Pat. No. 5,557,517.

(51) Int. Cl.
*G06F 17/60* (2006.01)

(52) U.S. Cl. ................. 705/36 R; 705/35; 705/37; 705/1; 705/4

(58) Field of Classification Search ............ 705/35–40, 705/1, 4, 36 R
See application file for complete search history.

(56) References Cited

U.S. PATENT DOCUMENTS

| | | | |
|---|---|---|---|
| 3,634,669 A | 1/1972 | Soumas et al. ................. 705/4 |
| 4,597,046 A | 6/1986 | Musmanno et al. ........... 705/36 |
| 4,598,367 A | 7/1986 | DeFrancesco et al. ........ 705/36 |
| 4,674,044 A | 6/1987 | Kalmus et al. ................ 705/37 |
| 4,766,538 A | 8/1988 | Fox ................................ 705/4 |
| 4,766,539 A | 8/1988 | Fox | |
| 4,774,663 A | 9/1988 | Musmanno et al. ........... 705/36 |
| 4,823,265 A | 4/1989 | Nelson .......................... 705/35 |
| 4,903,201 A | 2/1990 | Wagner ....................... 364/408 |
| 4,910,676 A | 3/1990 | Alldredge ..................... 705/37 |
| 4,942,616 A | 7/1990 | Linstroth et al. ............ 704/275 |
| 4,980,826 A | 12/1990 | Wagner ....................... 364/408 |
| 5,003,473 A | 3/1991 | Richards ....................... 705/37 |

(Continued)

FOREIGN PATENT DOCUMENTS

JP        02247791        10/1990

(Continued)

OTHER PUBLICATIONS

"Continou Time Finome"—Merton Klent C (1992).*

(Continued)

*Primary Examiner*—Hani M. Kazimi
*Assistant Examiner*—Narayanswamy Subramanian
(74) *Attorney, Agent, or Firm*—John M. Briski; James Hunt Yancey, Jr.; Troutman Sanders LLP

(57) ABSTRACT

The present invention introduces an apparatus and process which may be implemented on a vast variety of computer systems. The apparatus and process of the present invention use a computer system to receive and store data representative of a particular asset, a type of option (call or put), requested exercise price and a multitude of other variables related to the asset. The apparatus and process then generate data representative of an option premium. The data representative of the option may then be used for transacting an option, as the basis for determining a correlated expiring option premium, or to determine the premium of an asset relatable to a corresponding option.

11 Claims, 12 Drawing Sheets

U.S. PATENT DOCUMENTS

| | | | | |
|---|---|---|---|---|
| 5,083,782 | A | 1/1992 | Nilssen | 705/35 |
| 5,101,353 | A | 3/1992 | Lupien et al. | 705/37 |
| 5,132,899 | A | 7/1992 | Fox | 705/36 |
| 5,202,827 | A | 4/1993 | Sober | 705/36 |
| 5,227,967 | A | 7/1993 | Bailey | |
| 5,297,031 | A | 3/1994 | Gutterman et al. | 364/408 |
| 5,414,621 | A | 5/1995 | Hough | 364/401 |
| 5,414,838 | A | 5/1995 | Kolton et al. | |
| 5,557,517 | A * | 9/1996 | Daughterty | 364/408 |
| 5,563,783 | A | 10/1996 | Stolfo et al. | 364/408 |
| 5,692,233 | A * | 11/1997 | Garman | 705/36 |
| 5,721,831 | A | 2/1998 | Waits et al. | 395/210 |
| 5,727,165 | A | 3/1998 | Ordish et al. | 395/237 |
| 5,745,383 | A | 4/1998 | Barber | 364/554 |
| 5,765,141 | A | 6/1998 | Spector | 705/14 |
| 5,774,878 | A | 6/1998 | Marshall | 705/35 |
| 5,774,880 | A | 6/1998 | Ginsberg | 705/36 |
| 5,774,883 | A | 6/1998 | Anderson et al. | 205/38 |
| 5,818,914 | A | 10/1998 | Fujisaki | |
| 5,857,176 | A | 1/1999 | Ginsberg | 705/36 |
| 5,884,286 | A * | 3/1999 | Daughtery | 705/36 |
| 5,970,479 | A | 10/1999 | Shepherd | 705/36 |
| 6,061,662 | A * | 5/2000 | Makivic | 705/36 R |
| 6,134,536 | A * | 10/2000 | Shepherd | 705/37 |
| 6,173,276 | B1 * | 1/2001 | Kant et al. | 706/50 |
| 6,263,321 | B1 | 7/2001 | Daughtery, III | 705/36 |
| 6,381,586 | B1 * | 4/2002 | Glasserman et al. | 705/36 R |
| 6,418,417 | B1 * | 7/2002 | Corby et al. | 705/36 R |
| 2001/0025264 | A1 * | 9/2001 | Deaddio et al. | 705/36 |

FOREIGN PATENT DOCUMENTS

| | | |
|---|---|---|
| KP | 1996-0028072 A | 7/1996 |
| RU | 2022351 C1 | 10/1994 |
| RU | 2024930 C1 | 12/1994 |
| WO | WO 90/11571 A1 | 10/1990 |
| WO | WO98/12658 | 3/1998 |
| WO | WO00/52662 | 9/2000 |

OTHER PUBLICATIONS

Smith, Clifford W., "The Handbook of Financial Engineering," Chapter 11, *Option Pricing: A Review*, 1990, pp. 255-303, Harper Business Books, U.S.A.

Cox, John C. et al., The Handbook of Financial Engineering, Chapter 13, *Option Pricing: A Simplified Approach*, 1990, pp. 315-325, Harper Business Books, U.S.A.

Black, "Theory of Constant Proportion Portfolio Insurance", *Journal of Economic Dynamics and Control*, vol. 16, pp. 403-426, 1992.

Garman, "Perpetual Currency Options", *International Journal of Forecasting*, vol. 3, pp. 179-184, 1987.

Geltner, "Insights on the Effect of Land Use Choice: The Perpetual Option on the Best of Two Underlying Assets", *Journal of Urban Economics*, vol. 39, pp. 20-50, 1996.

Gerber et al, "On the Discounted Penalty at Ruin in a Jump-Diffusion and the Perpetual Put Option", *Insurance: Mathematics and Economics*, vol. 22, pp. 263-276, 1998.

Gerber et al., "Actuarial Bridges to Dynamic Hedging and Option Pricing", *Insurance: Mathematics and Economics*, vol. 18, pp. 183-218, 1996.

Gerber, "Martingale Approach to Pricing Perpetual American Options on Two Stocks", *Mathematical Finance*, vol. 6, No. 3, pp. 303-322, 1996.

Gerber et al., "From Perpetual Strangles to Russian Options", *Insurance: Mathematics and Economics*, vol. 15, pp. 121-126, 1994.

Harrison et al. "Martingales and Stochastic Integrals in the Theory of Continuous Trading", *Stochastic Processes and Their Applications*, vol. 11, pp. 215-260, 1981.

Howard et al. "Perpetual Fire Insurance", *Journal of Finance*, vol. 13(1), pp. 70-79, 1958.

Rottman, "Analysis of Perpetual Insurance", *The Journal of Risk and Insurance*, vol. 36, No. 4, pp. 365-382, Sep. 1969.

Myers, "Analysis of Perpetual Insurance: Comment", *The Journal of Risk and Insurance*, vol. 37, No. 3, pp. 481-482, Sep. 1970.

Rottman, "Author's Reply", *The Journal of Risk and Insurance*, vol. 37, No. 3, pp. 482-484, Sep. 1970.

Kratzas, *"Optimization Problems in the Theory of Continuous Trading"*, Society for Industrial and Applied Mathematics, pp. 1221-1259, Nov. 1989.

Martzoukos et al., *"Optimal Timing of Transmission Line Investments in the Face of Uncertain Demand"*, Energy Economics, pp. 3-8, Jan. 1992.

McKean, Jr., *"Appendix: A Free Boundary Problem for the Heat Equation Arising From a Problem of Mathematical Economics"* Industrious Management Review, vol. 6, pp. 32-39, 1965.

Myneni, *"The Pricing of the American Option"*, The Annals of Applied Probability, vol. 2, Issue 1, pp. 1-23, Feb. 1992.

Shiller, *"Measuring Asset Values for Cash Settlement in Derivative Markets: Hedonic Repeated Measures Indices and Perpetual Futures"*, Journal of Finance, vol. 48(3), pp. 911-931, Jul. 1993.

Sick, "Capital Budgeting With Real Options", Monograph Series in Finance and Economics, pp. 1-79, 1989.

Takahashi, "An Extension of Samuelson's Warrant Valuation Model and its Application to Japanese Data", Financial Engineering and the Japanese Markets:2, pp. 155-168, 1995.

Luskin, "Index Options & Future", Ch. 2, pp. 22-27, Ch. 5-6, pp. 75-125.

Merton, Robert C., "1973 Theory of Rational Option Pricing," Bell Journal of Economics and Management Science 4, 141-183.

Smith, Jr., Clifford W., 1990 The Handbook of Financial Engineering, Ch. 11, "Option Pricing: A Review", pp. 255-303, Harper Business Books, U.S.A.

Cox, John C. et al., 1990 The Handbook of Financial Engineering, Ch. 13, "Option Pricing: A Simplified Approach", pp. 316-325, Harper Business Books, U.S.A.

* cited by examiner

US 7,024,384 B2

APPARATUS AND PROCESS FOR CALCULATING AN OPTION

RELATED APPLICATIONS

This application is a Continuation of U.S. patent application Ser. No. 09/262,663 filed Mar. 4, 1999, now U.S. Pat. No. 6,263,321 which is a Continuation-In-Part of U.S. patent application Ser. No. 08/718,630 filed Sep. 17, 1996 and issued on Mar. 16, 1999 as U.S. Patent No. 5,884,286, which is a Continuation-In-Part of U.S. patent application Ser. No. 08/282,717 filed on Jul. 29, 1994 and issued on Sep. 17, 1996 as U.S. Pat. No. 5,557,517.

TECHNICAL FIELD

The present invention relates generally to an apparatus and process for automatically calculating options for use in a variety of markets, such as commodities or securities markets.

BACKGROUND

An "option" is generally used to hedge risk by providing the right to purchase or sell a commodity or other asset at a later time at a set price with only limited obligations. An option is similar to an insurance policy in that it insures that an asset may be purchased or sold at a later time at a set price in return for a premium, often referred to as an option premium, which is generally a relatively small percentage of the current value of the asset. One type of option is a "call option." A "call" option gives the purchaser of the option the right, but not the obligation, to buy a particular asset at a later time at a guaranteed price, often referred to as the "exercise price." Another type of option is a "put option". A "put" option gives the purchaser of the option the right, but not the obligation, to sell a particular asset at a later time at the exercise price. (The "put" option may be thought of as giving the owner the right to "put" the security into another's name at the exercise price.) In either instance, the seller of the call or put option is obligated to perform the associated transactions if the purchaser chooses to exercise its option.

Options are utilized in a variety of asset-based transactions. For example, in the commodities market, commodity producers (e.g., farmers) often enter into option relationships with commodity users (e.g., manufacturers) and speculators; in the real estate market, real estate owners often enter into option relationships with real estate purchasers; and in the securities market, security holders often enter into option relationships with security purchasers.

COMMODITY MARKET EXAMPLES

A commodity user such as a cereal manufacturer may need a certain amount of corn and wheat at a future date. The Cereal manufacturer, rather than purchasing the corn and wheat, may purchase a "call" option from a speculator by rendering an option premium. The call option guarantees an exercise price for a set amount of corn and wheat at a future date. The speculator, in return for receiving the option premium, agrees to obtain the set amount of corn and wheat and sell it to the cereal manufacturer at the exercise price at the future date.

If the price of the desired commodities increases, then the cereal manufacturer will likely exercise the "call" option and obtain the set amount of commodities from the seller at the guaranteed exercise price. Therefore, by paying the option premium in advance of knowing the future value of the commodities, the cereal manufacturer may save itself a substantial amount of money. If the price of the desired commodities does not reach the exercise price then the cereal manufacturer will not exercise the call option and will purchase the commodities on the open market at the going price.

A commodity producer, such as a farmer, may plant his fields many months in advance of having a commodity ready for delivery. To guarantee a set future price for his commodity, the farmer may purchase a "put" option from a speculator. Here, if the price of the farmer's commodities goes down over the set period of time the farmer is guaranteed to receive a set amount of minimum income for his efforts from the speculator.

Prior art systems are only capable of transacting options which expire after a certain period of "time". The purchaser of a call or put option using the prior art systems only has the right to exercise the option before it expires or on the expiration date.

As shown in FIGS. 8–11, for a set period of time, an option transacted using a prior art system has some value associated with it depending on the type of option, the current value of the asset relative to the exercise price and other variables. However, the moment after the option expires, a purchased option, as shown in FIGS. 8 and 9, is worthless causing an option purchaser who may have owned a valuable option one day to own a worthless option the next day. Furthermore, not only is the option worthless, but the purchaser of the call or put option is no longer protected against future price fluctuations associated with the asset. On the other hand, as shown in FIGS. 10 and 11, a sold option, which might be falling in value, automatically rises to the value of the option premium and removes all future risks to the option seller the moment after the option expires.

Turning to FIG. 8, a call option on shares of Company A is shown with an option premium of $5 per share and an exercise price of $55 per share. Ignoring the effect of "time" and other nominal costs associated with transacting options, the value of the options on the shares of Company A may increase or decrease based on the current price of the shares. For example, if the current share price rose from $50 to $56, then the value of the purchased call option would increase because it would be more likely to be exercised at the $55 per share exercise price. Further, if the current share price rose to $60, then the value of the purchased call option would increase even more because the owner of the purchased call option could now purchase shares of Company A at the exercise price of $55 and sell them for $60 on the open market resulting in a $5 per share profit. Moreover, the value of the purchased call option would continue to increase if the current share price of the shares of Company A continued to rise higher and higher. Accordingly, as long as the current price of the asset (the shares of Company A) continues to increase, the profits associated with the return on investment for a purchaser of a call option are unlimited. However, as might be expected, the exact opposite results for the seller of the call option (see FIG. 10) in that the losses attributed to the seller of a call option are unlimited.

On the other hand, continuing to ignore the effect of "time," if the current share price dropped from $50 to $45, then the value of the purchased call option would decrease because it would be less likely to be exercised at the $55 per share exercise price. Moreover, as the current share price dropped further, the purchased call option would be even less likely to be exercised. However, unlike the situation above where the value of the purchased call option continued to increase as the current share price increased, for a purchased call option associated with an asset which decreases in value, the maximum loss associated with the return on investment is limited to the option premium (for this example, $5 per share). Again, the exact opposite results for the seller of the call option in that the profits realized by the seller of a call option are capped at the option premium.

Referring to FIGS. 9 and 11, similar yet opposite results may be realized by the purchaser and seller of a put option, respectively, using a prior art system for transacting options. Here, assume that investor P purchases a put option from investors who sells the put option on the shares of Company A with an exercise price of $45 in six months in return for an option premium of $5 per share.

Here, again ignoring the effect of "time or other nominal costs," if the value of the shares of Company A fell to $44, then the value of the purchased put option (FIG. 9) would increase because it would be more likely to be exercised. Moreover, if the value of the shares continued to fall to $40, then the value of the purchased put option would increase even more because the owner of the purchased put option would be able to obtain shares of Company A at a price of $40 per share and sell these same shares at $45 per share by exercising its put option resulting in a $5 per share profit. Accordingly, as long as the current price of the asset (the shares of Company A) continue to decrease, the profits associated with the return on investment for a purchaser of a put option are limited to the exercise price (less the option premium paid) if the asset price fell to zero. However, the seller of the put option (See FIG. 12) realizes potential losses equal to the exercise price (less the option premium received) if the asset price fell to zero.

On the other hand, if the current share price increases, then the value of the purchased put option would decrease because it would be less likely to be exercised. However, regardless of how much the share price increased, the maximum loss associated with the return on investment that the purchaser of a put option would realize is limited to the option premium. In contrast, the seller of the put option realizes a maximum profit of the option premium.

Based on the above examples, it should be readily apparent that, ignoring "time," the purchaser of a call or a put option may essentially realize an unlimited gain while limiting his or her potential loss to the amount of the option premium. On the other hand, the seller of a call or a put option acts as an insurer by collecting the option premium in return for insuring that the purchaser of the option will be able to buy or sell the underlying asset at the exercise price. Thus, the Seller assumes all of the risks. To reallocate the risks, the element of time is used in option trading. The purchaser of an option is only allowed to exercise the option over a preset increment of "time".

Referring again to FIGS. 8 and 9, even though a purchased call option may increase in value as the current price of the asset increases, the value of the call option whose current price has yet to reach the exercise price must always battle "time." In other words, the closer that the call option gets to its expiration date, the more "time" will have a negative effect on the value of the purchased call option because "time" will be running out for the current price of the asset to reach the exercise price. If the current price of the asset on the expiration date is below the exercise price for the purchased call option the option holder will (1) be left holding an option worth absolutely nothing and (2) be left unprotected in its efforts to buy a particular asset at a later "time." Thus, the purchaser assumes much more of the risk when options are limited to set times.

Therefore, there exists a need in the art for a technique to limit the risk that an option purchaser must assume, which at the same time, is not unfair to the option Seller. More specifically, there exists a need in the art for an apparatus and process for calculating an option which is not dependent on "time" and is a fair value for the option Seller. The applicant refers to such an option as an "expirationless option."

Current techniques for calculating options are based on finite times such as 3 months, 6 months, 9 months, and at the most 3 years. In these techniques, the maximum price of an expiring option is considered to be the underlying security price. However, in actuality, the maximum price for any expiring option is its expirationless counter-part which is always less than the security price. For this reason, the probability space of expiring options has been incorrectly determined in the current art. This error helps explain inconsistencies in efficient markets such as "volatility smiles," where the theoretical price for an out-of-the-money option is higher than the actual price sellers are willing to receive. This error in pricing is because the probability distribution that is assumed in the current art is the value S, rather than the smaller value for an expirationless option. Therefore, there exists a need in the art for an apparatus and process to calculate option prices that are not based on the maximum price of the underlying security, but rather are based on the price of an expirationless option that is counter part to the expiring option.

A margin position is a means for an investor to purchase the right to acquire a particular asset (e.g., security) for an indefinite (expirationless) amount of time without having to pay the entire value of the asset at the time of purchase. An investor purchases the right to acquire the particular asset by opening a "long" margin position or a "short" margin position. A long margin position (also referred to as a conditional purchase) is opened when the investor expects the value of the asset to increase, and a short margin position (also referred to as a conditional sale) is opened when the investor expects the value of the asset to decrease.

As shown in FIG. 12, a long margin position investor realizes a Return On Investment ("ROI") equal to the current value of an asset when the investor closes the margin position less the value of the asset when he opened the margin positioned. Therefore, if the value of an asset increases from $20 to $30, then the long margin position investor realizes a $10 profit when it closes the margin position. However, if the value of the asset decreases to $5, then the same investor realizes a $15 loss.

On the other hand, as shown in FIG. 13, a short margin position investor realizes a ROI equal to the value of the asset when the investor opened the margin position less the value of the asset when it closes the margin position. Therefore, if the value of an asset decreases from $20 to $5, then the short margin position investor realizes a $15 profit when it closes the margin position.

However, if the value of the asset increases to $30, then the same investor realizes a $10 loss. These margin positions, both long and short, may or may not have an interest cost calculated on the value of the conditional sale or purchase.

A margin price in the securities market for an expirationless option on a particular asset is usually much higher than an option premium for an expiring option on the same asset. One reason for the substantial difference between the margin requirement and the option premium for an expiring option is that the entity (e.g., exchange or broker) offering the margin position essentially assumes more risk because, unlike the expiring option, the margin position does not automatically expire after a preset period of "time," (unless, of course, the underlying asset expires, such as a futures or commodity contract). Additionally, while an option purchaser has the right but not the obligation to execute the contract, each party in a margin position is obligated to perform.

Since any expiring asset must be a derivative of or represent a contingent claim on a non-expiring asset, the margin position is assumed to be on the base of a non-expiring asset. In the case of a futures contract on corn, though the margin position is actually for the futures contract which will expire, this margin requirement can be demonstrated to actually represent the margin requirement for the corn, or base asset, as well. Using current techniques, a change in the futures contract is accomplished by "rolling over", or exchanging one contract for another to maintain the maximum future date of delivery or sale. The present invention will make this unnecessary.

Unlike an option premium, the margin requirement is essentially refundable to the investor of a margin position. This refund is realized in that the margin requirement is applied to the purchase price (current value) at the time the investor of a margin position closes the margin position. Entities responsible for regulating margin positions (unscientifically) select a margin requirement balancing the demand of investors, speculators and hedgers with the protection of the respective market from default risk. These entities typically present margin requirements either as a fixed dollar amount (margin amount) associated with a particular asset or a fixed percentage (margin percentage) of the current price (value) of the particular asset.

A swap is a type of security transaction that is typically based on large amounts of money or securities wherein the parties to the swap exchange risks based on a notional amount. For instance, a swap may include Party A agreeing to pay a fixed interest rate on a certain amount of money (i.e., 100,000,000) to Party B, in exchange for Party B agreeing to pay a floating interest rate based on the same amount of money to Party A. Generally, the floating interest rate is based on an index, such as the T-bill rate, plus a fixed offset. As the underlying index fluctuates, the amount of money exchanged between Party A and Party B also fluctuates. However, the underlying amount of money, the $100,000,000, does not exchange hands.

Expirationless put and call option prices, because they have to be equal at the money, or where the current security price equals the exercise price, are arbitrized results. This is because the value of American options must equal the value of a replicating portfolio to avoid arbitrage opportunities and be consistent with economic equilibrium. Expirationless options are equivalent to a "swap" on the upside potential on the underlying security for the down side potential on the underlying security, or vise versa. Expirationless options can be considered a financial swap where the notional value is the underlying security price. Thus, there exists a need in the art for an apparatus and a process for calculating the price of an expirationless option that can be used as the basis of a swap agreement.

Experts in the securities market and other markets dealing with options have concluded for many years that any system for transacting an option can only generate an option premium, which is fair to both the purchaser and seller of the option, if data representing the "time" in which the option expires is input into the system. More specifically, all algorithms that have been derived for generating fair option premiums include a variable for "time". Such algorithms include the Black-Scholes and Binomial Pricing. While some professionals in the securities markets have discussed the pricing of expirationless options, they have ignored the arbitrized requirements that the put and call be equal at the money and have only focused on when and under what conditions exercise would be optimal. They have further ignored the equality of volatility and interest rate costs between expirationless options and the underlying security. This is a critical omission since, under the assumptions in the current art concerning rational expectations and the absence of economic dominance, the interest rate and volatility assumptions in an option position equivalent to the underlying security demands equality of volatility and interest rates between the expirationless option and the underlying security.

Moreover, not only is there a need for a system capable of transacting a fairly calculated premium for an option not dependent on "time," but there is a further need for such a system to automatically transact purchases and sales of expirationless options instantaneously while handling (1) the constantly changing current asset prices and other variables associated with the option premium pricing and (2) the high volume (millions) of daily options transacted in the securities market and other markets.

The above-referenced shortcomings, and other shortcoming of the prior art systems for calculating and transacting options that expire are effectively overcome by the present invention, as described in further detail below.

SUMMARY

The present invention includes an apparatus and a process for calculating and transacting options. In addition, the present apparatus and process for calculating option prices may be used in calculating and transacting any asset which can be constructed as an individual or series of options, regardless of their expiration date. The present invention may be applied for calculating expirationless options and option prices in the securities market, as well as a variety of other asset-based markets.

The present invention takes advantage of the inefficiency associated with the unscientifically selected margin requirements. More specifically, the present invention is able to combine the expirationless feature of the margin position and the limited risk of the expiring option by recognizing that, because the margin requirement is unscientifically selected, a price (an option premium) exists that would cause many dealing in margin positions and expiring options to find great benefits in transacting expirationless options.

The present invention takes advantage of the unscientifically selected margin requirements by recognizing a particular relationship between margin positions and options. As shown in FIG. 14, a long margin position is equivalent to a purchased expiring call option and a sold expiring put option when the effect of "time" is discounted. Additionally, as shown in FIG. 15, a short margin position is equivalent to a sold expiring call option and a purchased expiring put option. In sum, if the effect of "time" is discounted, an entity allowing an investor to open a margin position (e.g., a long margin position), is in the same position that it would be if it simply allowed an investor to purchase an expiring option (e.g., a call) and sell an expiring option (e.g., a put).

A significant feature of the present invention is that it is able to discount the effect of "time" to allow a margin position to be equivalent to a purchased and sold option, as described above. Specifically, the present invention is able to utilize any one of the multitude of expiring option algorithms for determining fair expiring option premiums, as mentioned in the Background of the Invention, to discount the effect of "time."

All expiring option premium algorithms, in addition to including a "time" variable, include readily observable variables, such as the current value (price) of the asset, the historic price volatility of the asset (the standard deviation of the asset's historic price movement) and the current risk-free interest rate (the rate of return without default risk, such as a U.S. government T-Bill rate). Further, all expiring option premium algorithms include variables for the exercise price. Accordingly, the present invention uses the expiring option premium algorithms to discount the effect of "time" according to the following process: (1) the exercise price is set equal to the current price of the asset and (2) the option premium is set equal to the margin requirement for the asset. The present invention then uses the expiring option premium algorithm to generate the anticipated point in "time" (implied time) in which an expiring option would expire if the purchaser paid an option premium equal to the unscientifically set margin requirement of the asset and if the exercise price was equal to the current asset price (as it is for a margin position at the moment it is opened).

The present invention utilizes the above process because the exercise price is always equal to the current asset price at the moment when the margin position is opened, and this is the point in time when an investor of a margin position would gladly pay an inflated option premium equal to the margin position requirement to limit his risk. Accordingly, the present invention is able to discount "time" to price a purchased and sold option such that they are equivalent to a margin position at the point where the asset price is assumed equal to the exercise price.

After the implied time value is generated, the present invention sets the time value in the expiring option premium algorithm equal to the implied time value. The present invention then generates an expirationless option premium based on the particular exercise price selected by the investor.

The present invention may be implemented on a vast variety of computer systems. More particularly, the present invention employs a computer system to receive and store data representative of the particular asset, a type of option (call or put), a requested exercise price and the multitude of other variables related to transacting an expirationless option on the asset. Then, responsive to the data received, the present invention uses the computer system to generate data representative of an expirationless option premium, and to transact the expirationless option using the expirationless option premium.

In use, when a user wishes to purchase or sell an expirationless option, the user is prompted to input data representative of the asset, the type of option and the requested exercise price for the asset, into a keyboard or other means of the computer system. The apparatus and process of the present invention then prompt the user to enter certain other data related to transacting an expirationless option on the asset. The certain other data includes the current price for the asset on the open market, the historic price volatility of the asset, the current risk-free interest rate and the margin requirement associated with the asset. Because this data typically changes frequently, the present invention may alternatively receive this data from one or more data source (e.g., a database or real-time quote service such as S&P ComStock), connected to the computer system of the present invention. After all of the data is received, it is stored on a storage medium of the computer system.

The present invention then uses one of the expiring option premium algorithms to generate the data representative of the expirationless option premium. More specifically, the present invention temporarily sets the option premium variable of these algorithms to the margin requirement data, temporarily sets the exercise price variable of these algorithms to the current asset price data and generates data for the implied time of these algorithms. The present invention then uses the implied time data and the exercise price data input by the user to generate the data for the option premium variable of these algorithms.

The option premium data generated is the expirationless option premium used to transact the expirationless option for the particular asset. Accordingly, the option premium data is output for use in completing the expirationless option transaction.

The present invention is particularly important to those who wish to protect themselves against price swings for indefinite periods of "time." In other words, individuals and entities may now concern themselves solely with the future price of an asset, and cease concerning themselves with the seemingly impossible task of predicting the "time" in which the asset may hit that price.

For example, a cereal manufacturer whose cereal prices to its customers depend significantly on the price in which they are able to purchase wheat, can now better assure their customers of steady cereal prices by purchasing an expirationless call option using the present invention. More specifically, the cereal manufacturer can now ensure itself that it may continue to purchase wheat at or below a certain price (the exercise price), regardless of the "time" in the future when the price of wheat rises above the exercise price. Referring to FIG. 16, by utilizing the present invention, in return for the option premium, the cereal manufacturer is able to purchase an expirationless call option which has unlimited upside potential, limited downside potential (the option premium) and never becomes worthless.

On the other hand, a farmer whose family depends on being able to sell his entire crop of wheat for a set minimum price would benefit significantly. Specifically, the farmer who was unable to predict whether wheat prices might drop next year or in five years may purchase an expirationless put option using the present invention to ensure that his wheat will be purchased at a certain price (the exercise price) regardless of the "time" in the future when the price of wheat drops below the exercise price. Referring to FIG. 17, by utilizing the present invention, in return for an option premium, the farmer is able to purchase an expirationless put option which has unlimited upside potential, limited downside potential (the option premium) and never becomes worthless.

Another aspect of the present invention is that it is capable of handling constantly changing current asset prices and other variables associated with generating the option premium price and transacting the expirationless option. As described above, by using one or more data source, data from a variety of places, regardless of location, may be constantly updated and stored for use in generating the option premium price at any given moment in time.

A further aspect of the present invention is that it is capable of automatically and essentially instantaneously transacting an expirationless option in the securities market and other markets throughout the world. This is especially important in the securities market because millions of option contracts are typically transacted daily. This feature is also important because of the volatility of the variables used to generate the option premium price. This makes the essentially instantaneous transaction capability imperative, especially in the securities market.

A yet further aspect of the present invention is that it is capable of handling extinction bands. An extinction band is a price higher than the exercise price for a put option and lower than the exercise price for a call option. The extinction band price is selected because a particular entity responsible for exchange management may wish to implement expirationless options without significantly increasing record-keeping requirements for the respective exchange. By introducing extinction bands, or forced closure of an expirationless option based not on time, but on the distance of the exercise price from the current asset price, an exchange may retain the aforementioned benefits of expirationless options for their members without significantly increasing record keeping requirements. The pricing algorithm for this variant of the expirationless option assumes that both the band, the maximum distance of the exercise price from the asset price and the extinction date (or the effective date of measurement of the exercise price from the current asset price) for these options is known. If these variables are not known, then the expirationless option with extinction bands is priced exactly as the expirationless option without extinction bands.

A yet further aspect of the present invention is that it is capable of facilitating the determination of conventional expiring option premiums utilizing the expirationless option price as the maximum price for the expiring option. This allows for more accurate determination of the option price than is possible using the underlying security price as the maximum price of an expiring option.

Yet another aspect of the present invention is that it is capable of facilitating the accurate determination of premiums for any financial instrument which can be expressed in terms of an option or combination of options. In order to determine a premium for a financial instrument, the premiums for corresponding option or options are first determined utilizing the corresponding expirationless option price. The expiring option premiums are then relatable to the premiums of the related financial instrument as appropriate for the instrument type. Examples of financial instruments which may be determined utilizing the present invention include, but are not limited to equity, bonds, futures, forwards and swaps.

The aforementioned and other aspects of the present invention are described in the detailed description and attached illustrations which follow.

DETAILED DESCRIPTION

Figure 1:
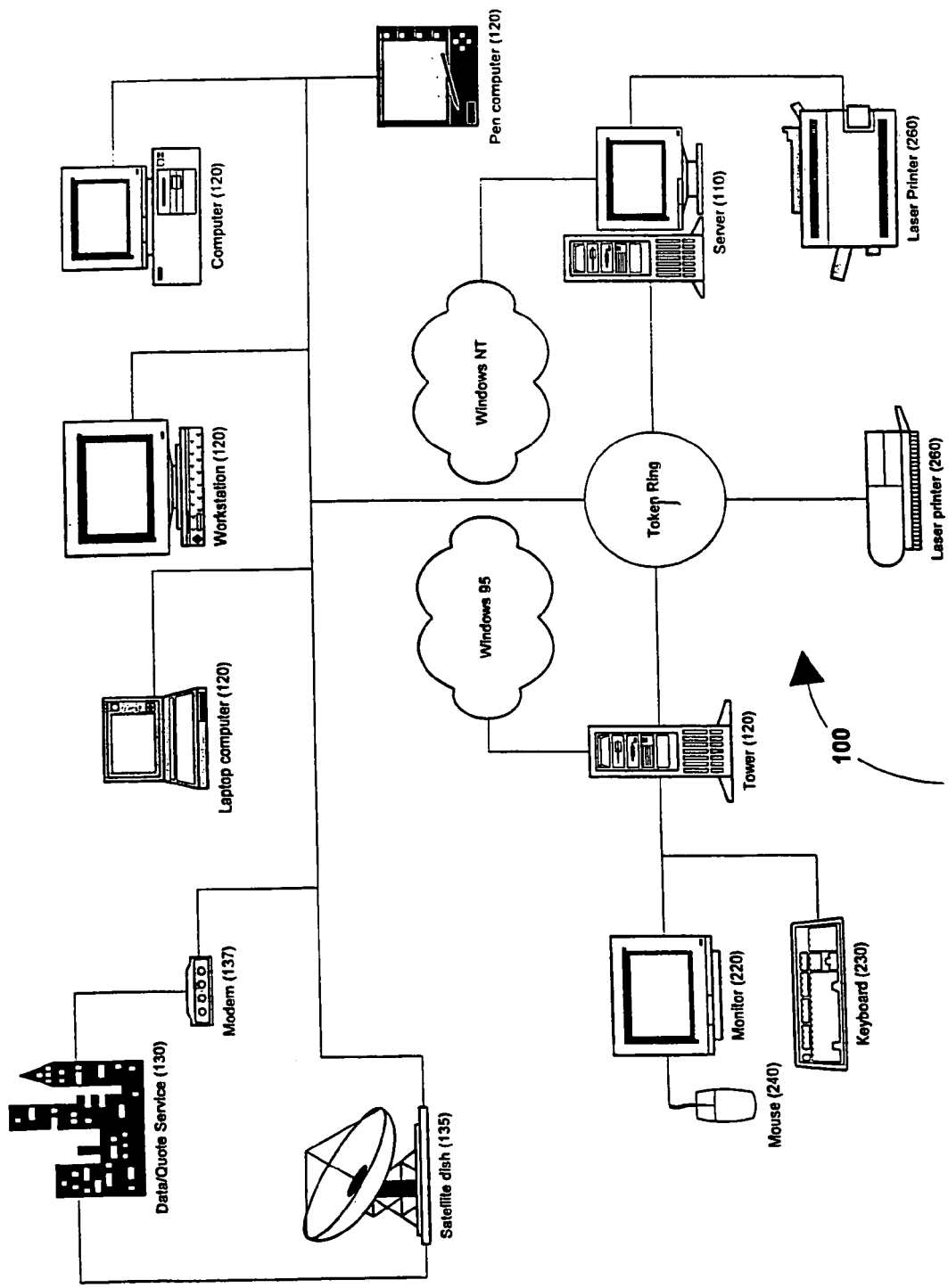
FIG. 1 depicts a diagram of a exemplary computer system for implementing the present invention.

The various aspects of the present invention may be implemented on numerous types of computer systems, but is preferably implemented on a client/server network 100 as shown in FIG. 1. The client/server network 100 includes a server 110 connected to a plurality of clients 120, also known as end-user workstations, and a data source 130 running on a token ring environment.

Figure 2:
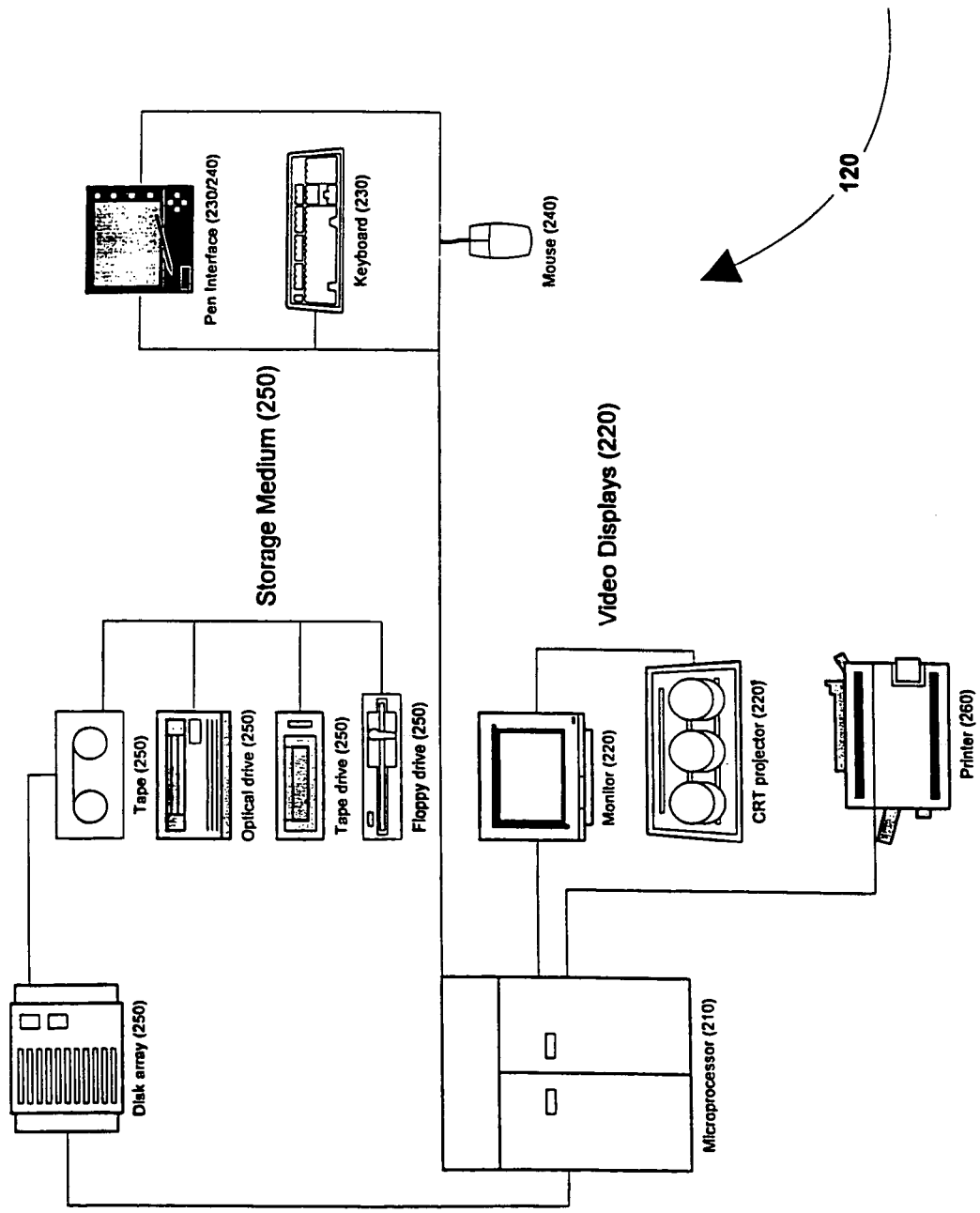
FIG. 2 depicts components of an end user workstation for the computer system of FIG. 1 for implementing the present invention.

As shown in FIG. 2, each end user workstation 120 may includes a microprocessor 210, a display 220, a keyboard 230, a mouse 240, a printer 260, and a storage medium 250 (e.g., a disk array, tape, optical drive, tape drive or floppy drive).

Figure 3:
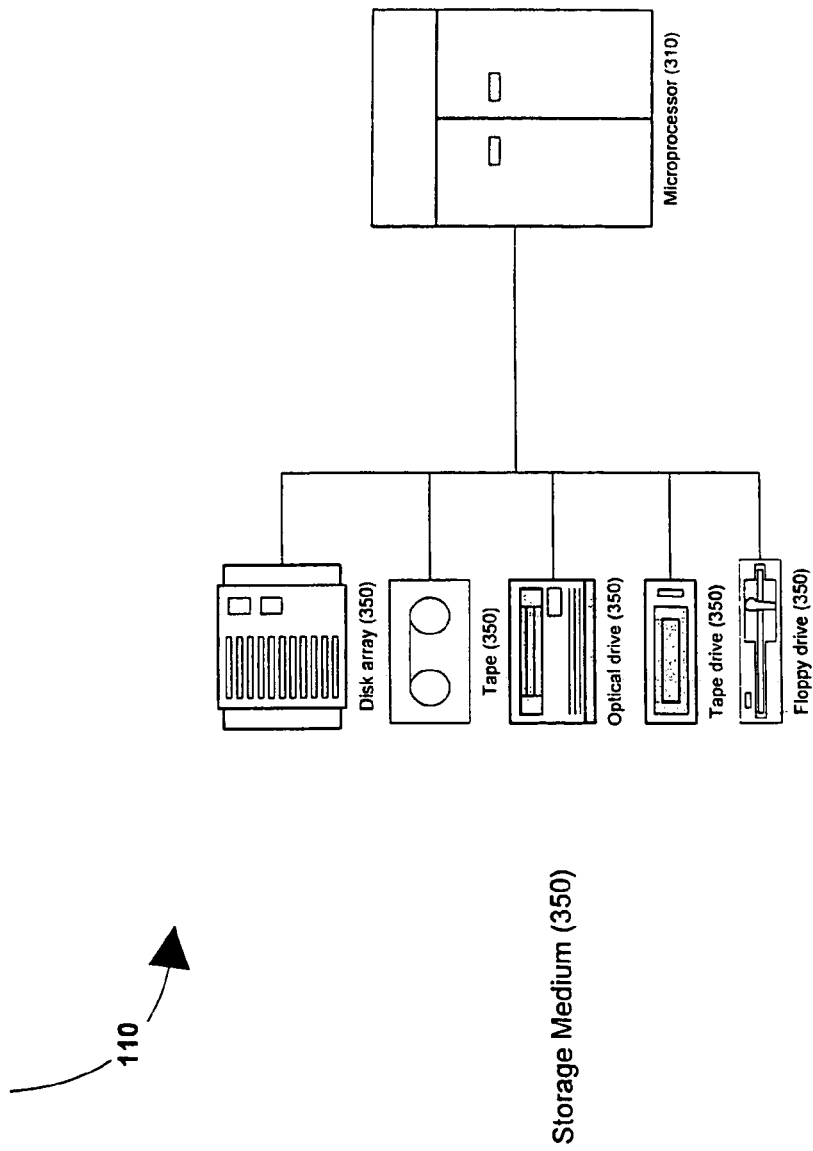
FIG. 3 depicts components of a server for the computer system of FIG. 1 for implementing the present invention.

As shown in FIG. 3, each server 110 may include a microprocessor 310 and a storage medium 350. The server may use Microsoft NT or peer-to-peer with one peer dedicated as a server or their equivalent.

Data sources 130 may be a Quotron system or its equivalent, which may regularly receive data via satellite communications 135, land line connections (e.g., a modem) 137 or the like. However, any other source capable of receiving and providing data relevant to transacting the expirationless option may be used in the present invention.

An exemplary client/server network suitable for implementing aspects of the present invention is a Windows NT PC LAN. These clients, servers, and client/server networks are mentioned for illustrative purposes only and, as may be appreciated by one of ordinary skill in the art, suitable equivalents may be substituted.

In an expemplary embodiment, when a user wishes to purchase or sell an expirationless option related to a particular asset, the user may view the display 220 of the end user workstation 120 to obtain instructions on how to transact the expirationless option contract.

Figure 4:
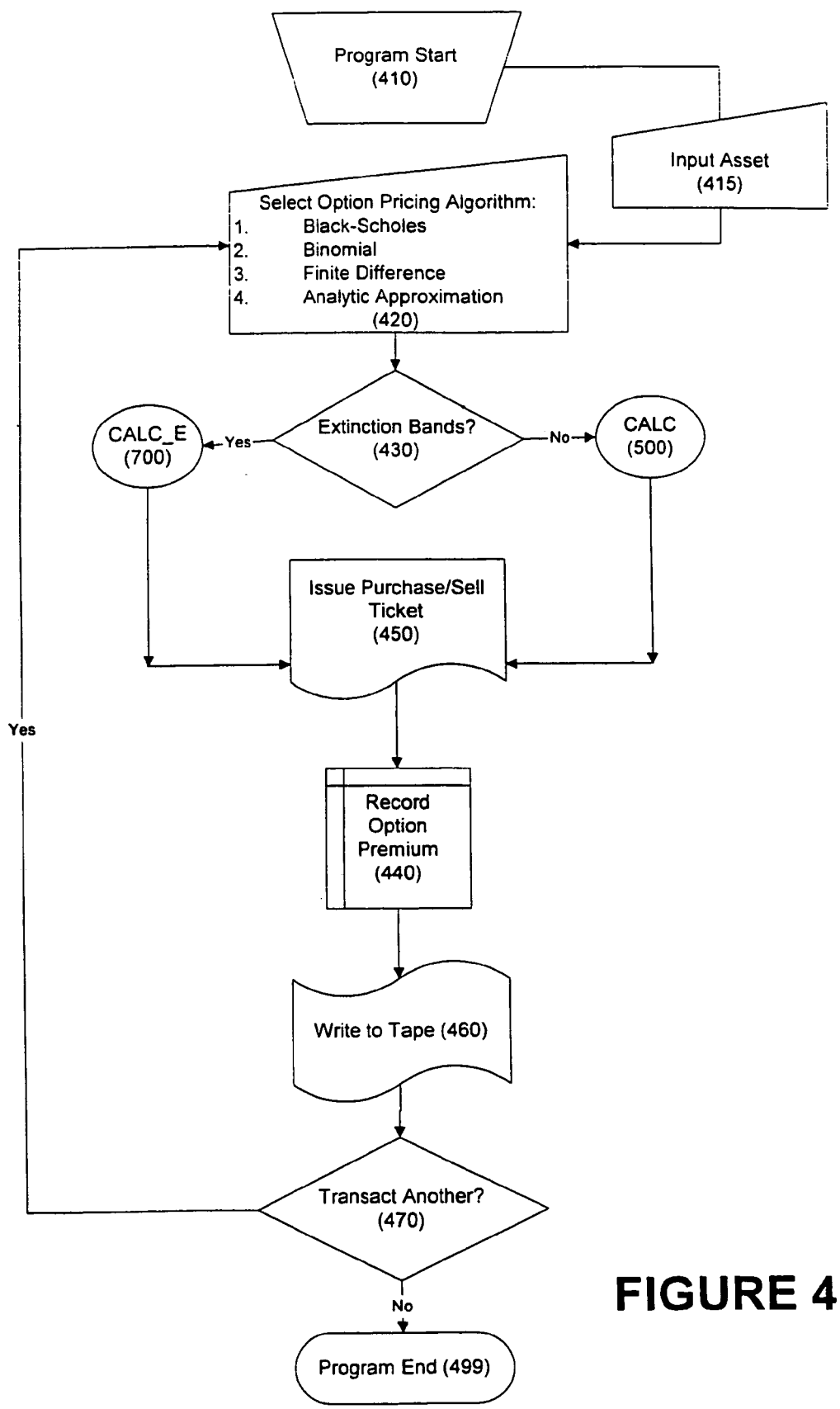
FIG. 4 depicts a flow diagram of a exemplary embodiment for the Main Module of the present invention.

Referring to FIG. 4, at step 410 of the Main Module, the display 220 displays a prompt requesting the user to indicate when the user is ready to transact the expirationless option. By pressing the ENTER key on the keyboard 230 or clicking on a START box on the display 220 with the mouse 240, the present invention starts its operation of transacting the expirationless option by proceeding to step 420. For simplicity purposes, it may be assumed that the microprocessor 210 of the end-user workstation 120 and the microprocessor 310 of the server 110 coordinate all tasks of the end-user workstation 120 and server 110 of the computer system, respectively, and all tasks between the two.

At step 415, the user is prompted to input data representative of a particular asset. Upon receiving the data representative of a particular asset, the present invention proceeds to step 420.

At step 420, the user is prompted to select which option pricing algorithm he or she wishes to use to transact the expirationless option. Such algorithms include, but are not limited to, the Black-Scholes, the Binomial Pricing, the Finite Difference and the Analytic Approximation algorithms. These algorithms are widely used in connection with determining expiring option premiums and are available in both proprietary and shareware software from Montgomery Investment Technology. The option prices provided in this detailed description were determined using this free Internet service, and demonstrate that any option pricing algorithm may be used to determine expirationless option prices. For example, the Black-Scholes algorithm is:

$$c = S \cdot \int_{-\infty}^{\frac{\ln(\frac{S}{X}) + \left[r + \left(\frac{\sigma^2}{2}\right)\right]T}{\sigma\sqrt{T}}} \frac{1}{\sqrt{2\pi}} e^{-\frac{z^2}{2}} dz - e^{-rT} X \cdot$$

$$\int_{-\infty}^{\frac{\ln(\frac{S}{X}) + \left[r - \left(\frac{\sigma^2}{2}\right)\right]T}{\sigma\sqrt{T}}} \frac{1}{\sqrt{2\pi}} e^{-\frac{y^2}{2}} dy$$

Where:
c=OPT_PREM=the option premium
S=ASSET_PRICE=the current price for a particular asset
X=X_PRICE=the exercise price
r=T_BILL=the current risk-free interest rate
s=VOLATLTY=the standard deviation of the historic asset price movement commonly referred to as the asset's volatility
T=the time until expiration (for an expiring option)

In another example, the Binomial Pricing algorithm is:

$$c = \frac{\left[\sum_{j=0}^{n} \left(\frac{n!}{j!(n-j)!}\right) p^j (1-p)^{n-j} \max[0, u^j d^{n-j} S - K]\right]}{r^n}$$

Where:
c=OPT_PREM=the option premium
S=ASSET_PRICE=the current price for a particular asset
K=X_PRICE=the exercise price
r=T_BILL=the current risk-free interest rate
n=the number of periods (the time) until expiration (for an expiring option)

$$p = \frac{r-d}{u-d}$$

u=minimum value of an upward movement in the price of the underlying asset (e.g., $⅛$^{th} in most stocks), and
d=minimum value of a downward movement in the price of the underlying asset ($0.0001 in most futures or commodities)
Note: u and d are generally established by the exchange and may be stored in a storage medium for access or simply input into the system on an as needed basis.

Further, as one of ordinary skill in the art would readily appreciate, other related expiring options algorithms may be used to transact an expirationless option. Upon receiving a number related to the user's selected algorithm processing continues at step 430. In an alternative embodiment step 420 may be removed entirely by only using a single option algorithm.

At step 430, the user is prompted to input whether or not it wishes to include extinction bands in the expirationless option transaction. If the user selects no, then processing continues at step 500, otherwise processing continues at step 700.

Figure 5:
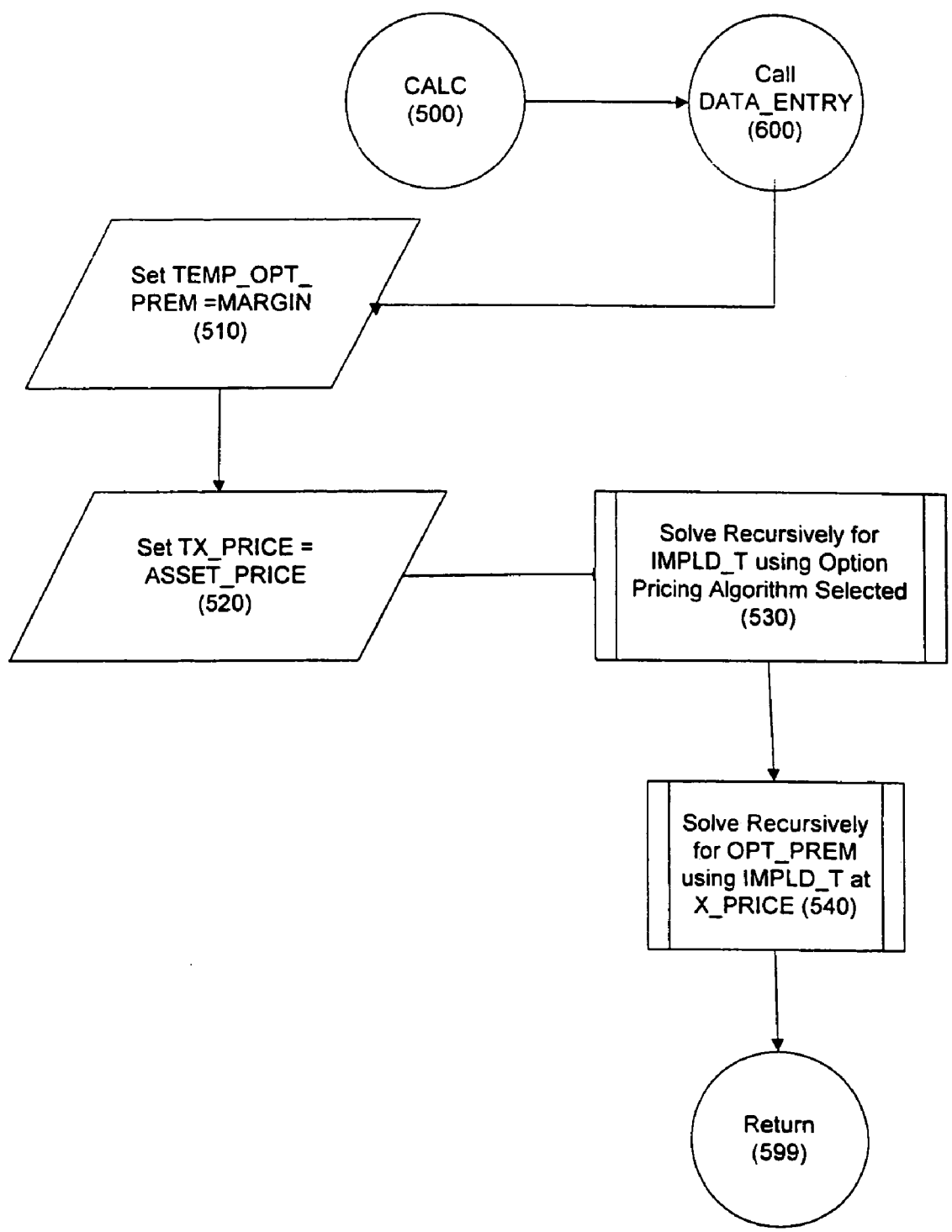
FIG. 5 depicts a flow diagram of a exemplary embodiment for the CALC module of the present invention, which calculates the expirationless option premium ignoring extinction bands.

Referring to FIG. 5, at step 500 the CALC Module is executed. The CALC Module is used to calculate the expirationless option premium ignoring extinction bands. Of course, if used exclusively in markets or on exchanges without extinction bands, step 430 may be removed entirely.

Figure 6:
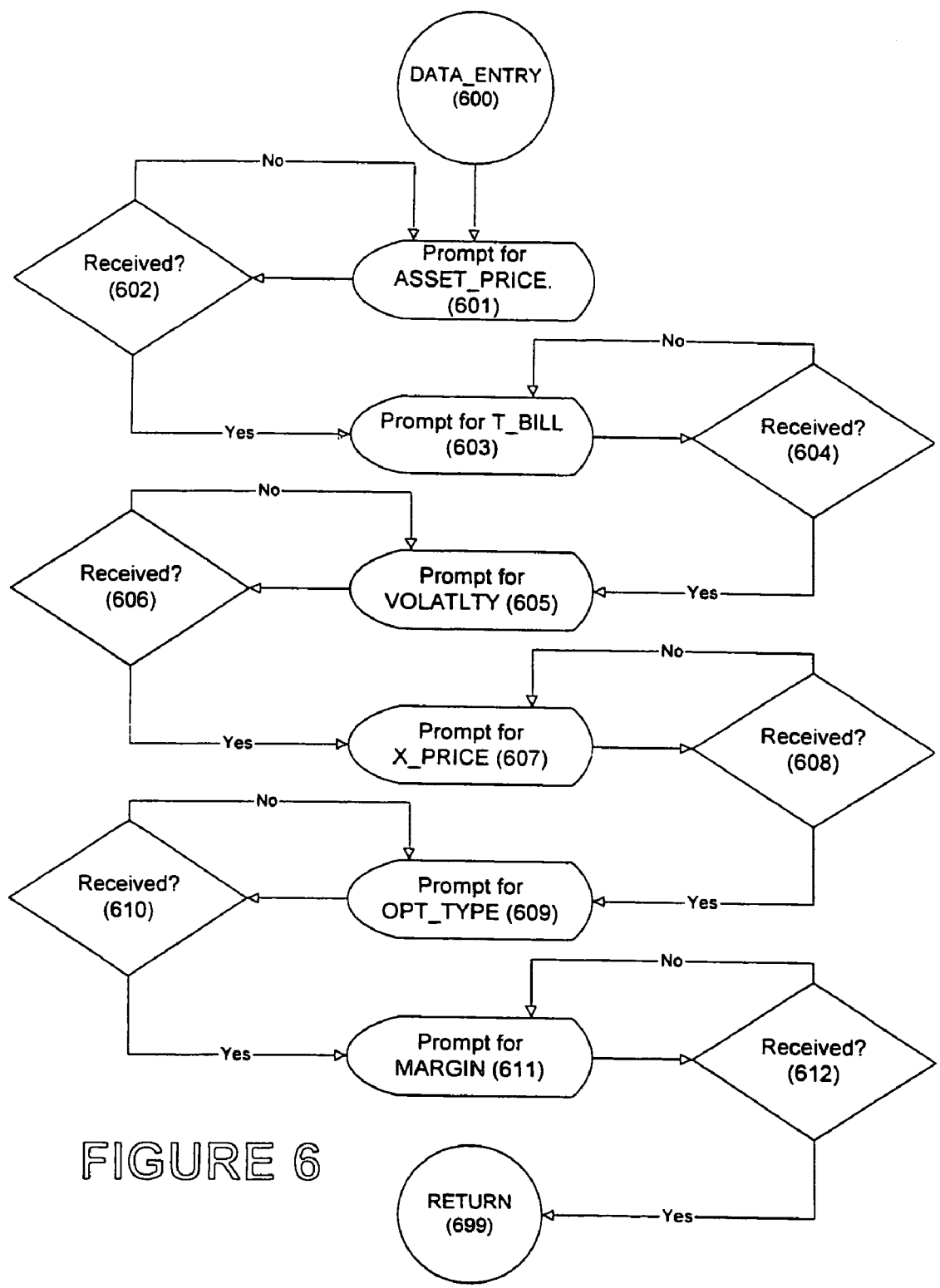
FIG. 6 depicts a flow diagram of a exemplary embodiment for the DATA_ENTRY module of the present invention, which prompts the user to enter certain data for transacting the expirationless option.

Processing then continues at step 600 where the DATA_ENTRY Module is executed. The DATA_ENTRY Module, as shown in FIG. 6, is used to prompt the user to input data and to accept the data input by the user.

At step 601, the user is prompted to input the current price for the particular asset. The user may obtain the current price for the particular asset from a variety of sources, such as the data source 130. At step 602, it is determined whether the current price of the asset has been received. If not, then processing returns to step 601, otherwise the current price of the asset received is stored in the ASSET_PRICE variable in the storage medium 250 and processing continues at step 603.

In another embodiment, steps 601 and 602 may be replaced by a step which automatically accesses the current price for the particular asset from the data source 130. In yet another embodiment, steps 601 and 602 may be replaced by a step which automatically accesses the current price for the particular asset from the storage medium 350 of the server 110 which may be updated automatically by the data source 130 or manually by an administrator of the network.

At step 603, the user is prompted to input the current risk-free interest rate. The user may obtain the current risk-free interest rate from a variety of sources, such as the data source 130. At step 604, a determination is made as to whether the current risk-free interest rate has been received. If not, then the processing continues at step 603, otherwise the current risk-free interest rate received is stored in the T_BILL variable in the storage medium 250 and processing continues at step 605.

In another embodiment, steps 603 and 604 may be replaced by a step which automatically accesses the current risk-free interest rate from the data source 130. In yet another embodiment, steps 603 and 604 may be replaced by a step which automatically accesses the current risk-free interest rate from the storage medium 350 of the server 110 which may be updated automatically by the data source 130 or manually by an administrator of the network.

At step 605, the user is prompted to input the standard deviation of the price movement related to the asset known as the "historic price volatility of the asset." The user may obtain the historic price volatility of the asset from a variety of sources, such as the data source 130. At step 606, a determination is made as to whether the historic price volatility of the asset has been received. If not, then the processing continues at step 605, otherwise the historic price volatility of the asset received is stored in the VOLATLTY variable in the storage medium 250 and processing continues at step 607.

In another embodiment, steps 605 and 606 may be replaced by a step which automatically accesses the historic price volatility of the asset from the data source 130. In yet another embodiment, steps 605 and 606 may be replaced by a step which automatically accesses the historic price volatility of the asset from the storage medium 350 of the server 110 which may be updated automatically by the data source 130 or manually by an administrator of the network.

At step 607, the user is prompted to input the exercise price for the particular asset. At step 608, a determination is made as to whether the exercise price of the asset has been received. If not, then processing continues at step 607, otherwise the exercise price of the asset received is stored in the X_PRICE variable in the storage medium 250 and processing continues at step 609.

At step 609, the user is prompted to input the option type (either a call option or a put option). At step 610, the present invention then verifies whether the option type has been received. If not, then the processing returns to step 609, otherwise the processing stores the option type under the OPT_TYPE variable in the storage medium 250 and proceeds to step 611.

At step 611, the user is prompted to input the margin requirement (margin amount or margin percentage) related to the particular asset. The user may obtain the margin requirement from a variety of sources, such as the data source 130. At step 612, a determination is made as to whether the margin requirement for the asset has been received. If not, then processing returns to step 611, otherwise the margin requirement for the asset received is stored in the MARGIN variable in the storage medium 250 and processing continues at step 699, and then to step 510 of the CALC Module at FIG. 5.

In another embodiment, steps 611 and 612 may be replaced by a step which automatically accesses the margin requirement from the data source 130. In yet another embodiment, steps 611 and 612 may be replaced by a step which automatically accesses the margin requirement from the storage medium 350 of the server 110 which may be updated automatically by the data source 130 or manually by an administrator of the network.

At step 510, the temporary option premium is equated to the value of the margin requirement (MARGIN) and stored in the TEMP_OPT_PREM variable in the storage medium 250. Processing then continues at step 520, where a temporary exercise price is set equal to the current price of the asset (ASSET_PRICE) and the temporary exercise price is stored under the TX_PRICE variable in the storage medium 250. Processing then continues at step 530.

At step 530, the implied time for the expirationless option is determined using the option pricing algorithm selected at step 420. The implied time is then stored in the IMPLD_T variable in the storage medium 250. Processing then continues at step 540.

At step 540, the actual option premium for the expirationless option is determined by again using the option pricing algorithm selected at step 420, the X_PRICE selected at step 607, and the implied time value (IMPLD_T). Processing then continues at step 440 of the Main Module at FIG. 4.

Figure 7:
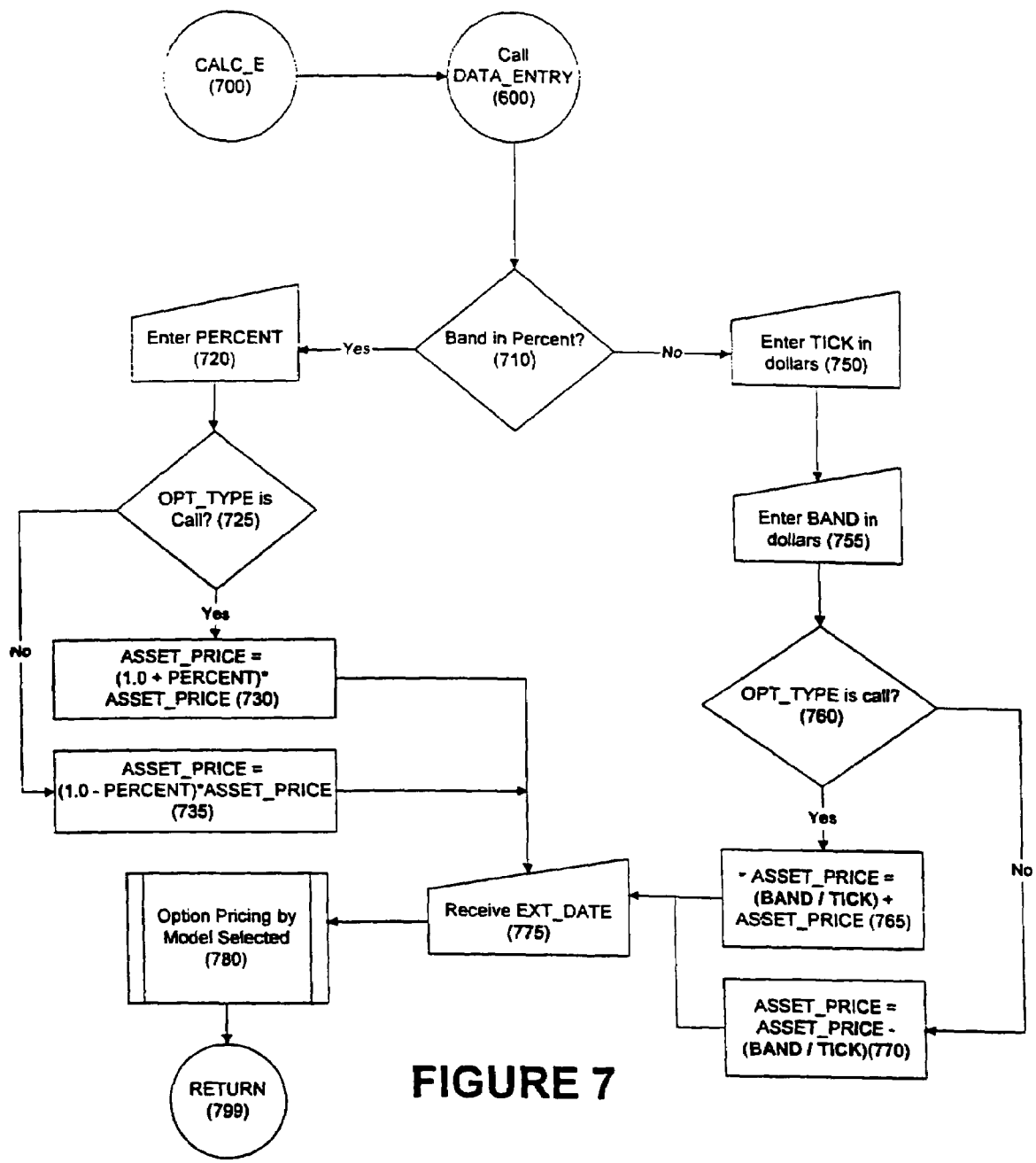
FIG. 7 depicts a flow diagram of a exemplary embodiment for the CALC_E module of the present invention, which calculates the expirationless option premium with extinction bands.
Figure 8:
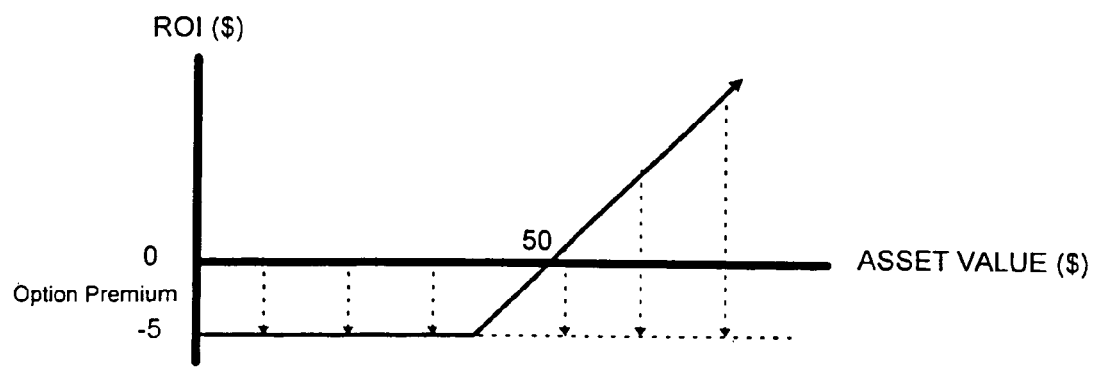
FIG. 8 depicts a graph which illustrates the potential Return on Investment (ROI) versus the Value of an Asset (Asset Value) for a purchased expiring option transacted on a prior art system.
Figure 9:
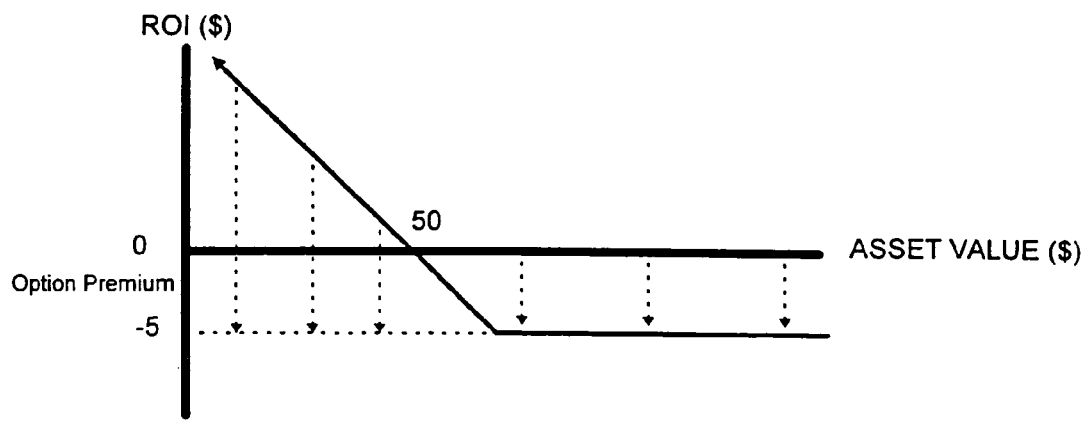
FIG. 9 depicts a graph which illustrates the potential ROI versus the Asset Value for a purchased expiring put option transacted on a prior art system.
Figure 10:
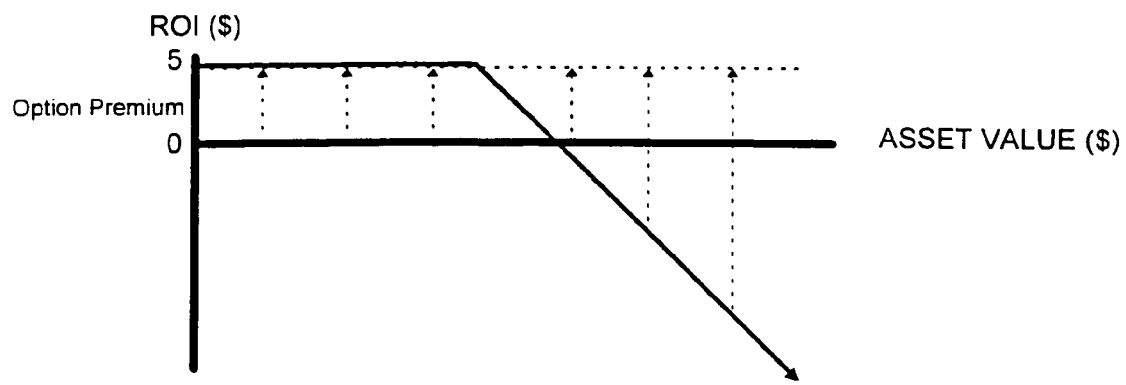
FIG. 10 depicts a graph which illustrates the potential ROI versus the Asset Value for a sold expiring option transacted on a prior art system.
Figure 11:
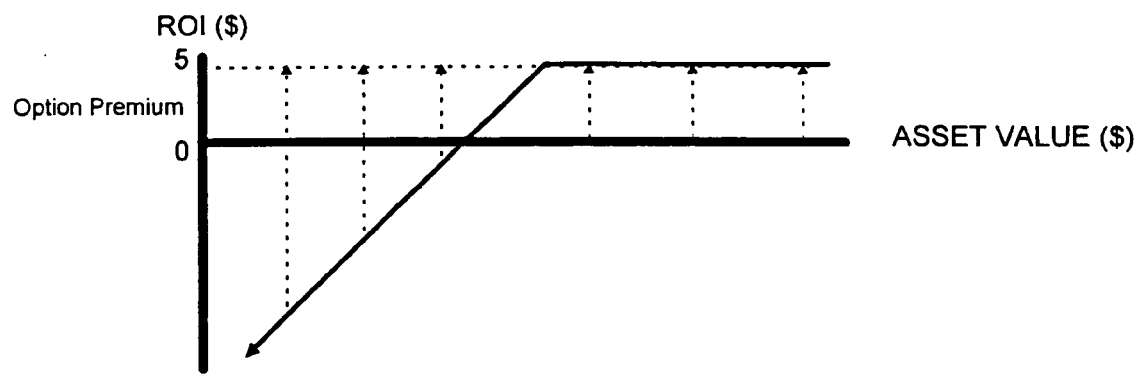
FIG. 11 depicts a graph which illustrates the potential ROI versus the Asset Value for a sold expiring put option transacted on a prior art system.
Figure 12:
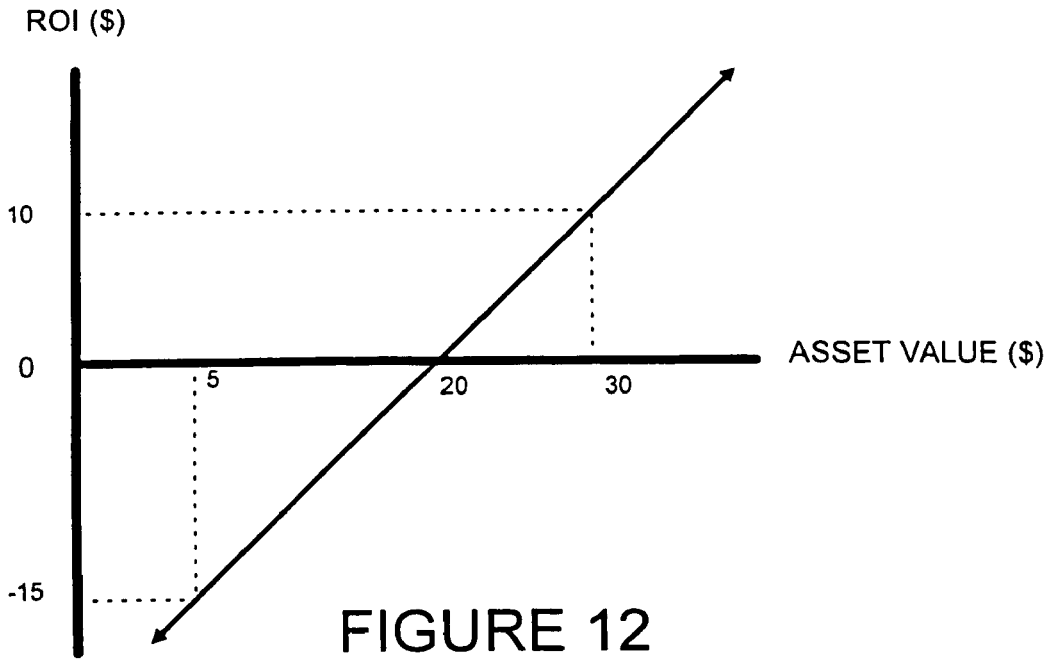
FIG. 12 depicts a graph which illustrates the potential ROI versus the Asset Value of a long margin position.
Figure 13:
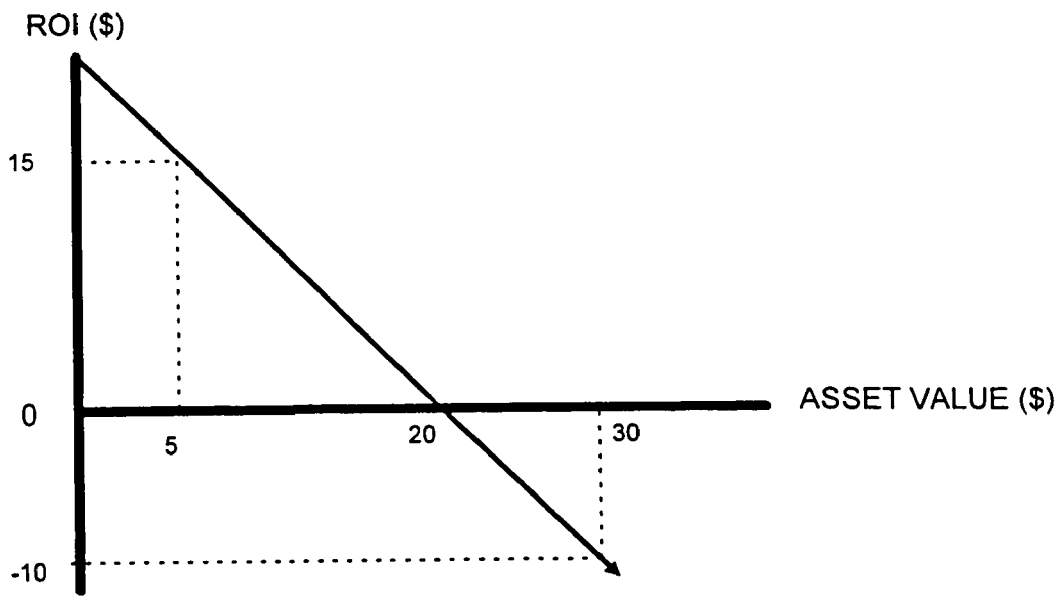
FIG. 13 depicts a graph which illustrates the potential ROI versus the Asset Value of a short margin position.
Figure 14:
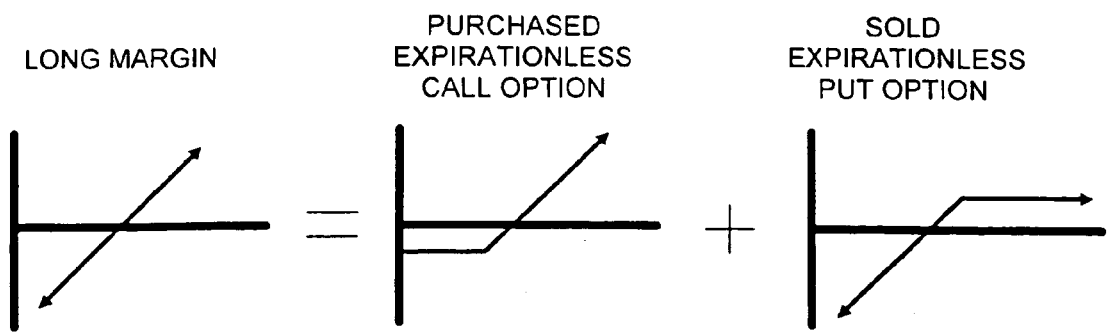
FIG. 14 illustrates the equivalent relationship between a long margin position and a purchased call expirationless option (expiring option with time discounted) plus a sold put expirationless option (expiring option with time discounted).
Figure 15:
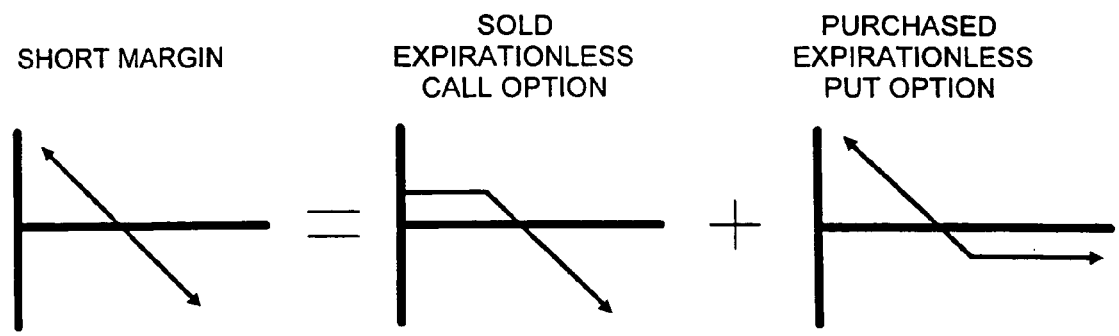
FIG. 15 illustrates the equivalent relationship between a short margin position and a sold call expirationless option (expiring option with time discounted) plus a purchased put expirationless option (expiring option with time discounted).
Figure 16:
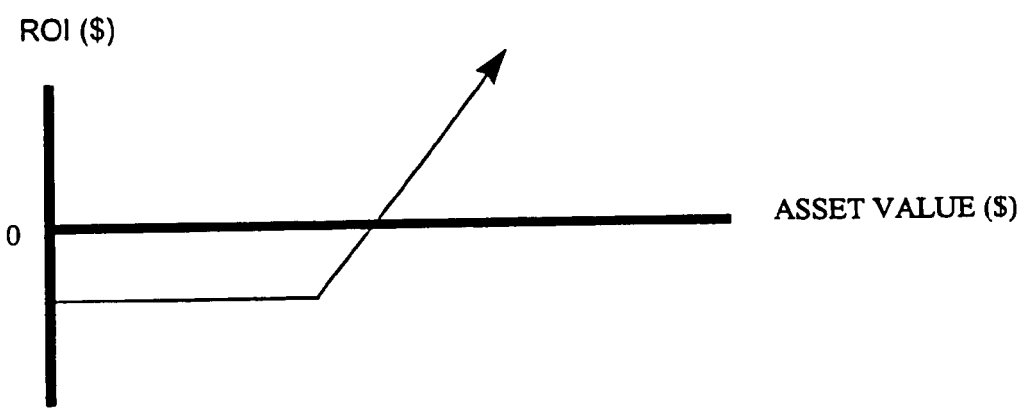
FIG. 16 depicts a graph which illustrates the potential ROI versus the Asset Value of a purchased call expirationless option transacted using the apparatus and process of the present invention.
Figure 17:
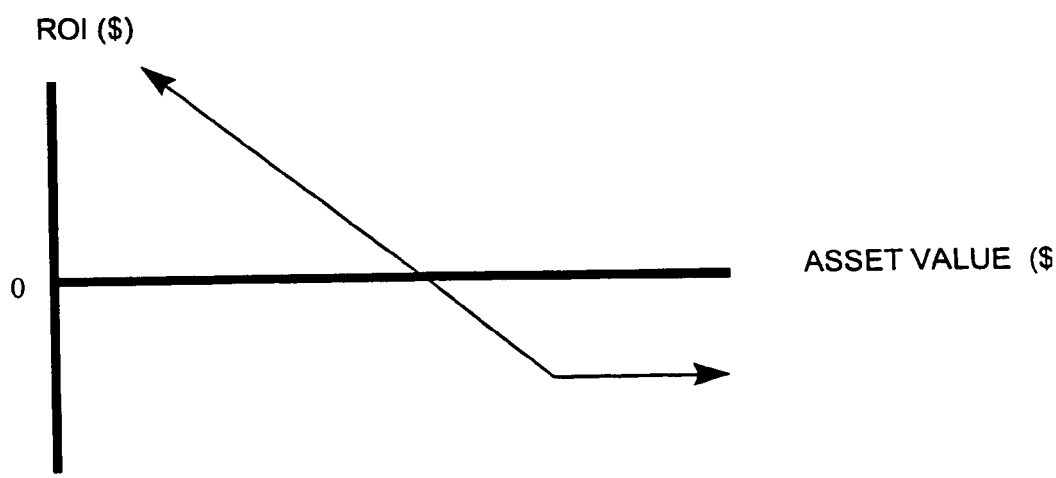
FIG. 17 depicts a graph which illustrates the potential ROI versus the Asset Value of a purchased put expirationless option transacted using the apparatus and process of the present invention.

Referring back to step 430, if the user selects to include extinction bands in the expirationless option transaction, processing continues at step 700 of the CALC_E module. Referring to FIG. 7 at step 700 the CALC_E module calculates the expirationless option premium taking into account extinction bands.

Processing then continues at step 600 at the DATA_ENTRY Module. Again, the DATA_ENTRY Module, as shown in FIG. 6, is used to prompt the user to input data and to accept the data input by the user.

At step 601, the user is prompted to input the current price for the particular asset. The user may obtain the current price for the particular asset from a variety of sources, such as the data source 130. At step 602, a determination is made as to whether the current price of the asset has been received. If not, then processing returns to step 601, otherwise the current price of the asset received is stored in the ASSET_PRICE variable in the storage medium 250 and processing continues at step 603.

In another embodiment, steps 601 and 602 may be replaced by a step which automatically accesses the current price from the data source 130. In yet another embodiment, steps 601 and 602 may be replaced by a step which automatically accesses the current price from the storage medium 350 of the server 110 which may be updated automatically by the data source 130 or manually by an administrator of the network.

At step 603, the user is prompted to input the current risk-free interest rate. The user may obtain the current risk-free interest rate from a variety of sources, such as the data source 130. At step 604, a determination is made as to whether the current risk-free interest rate has been received. If not, then processing returns to step 603, otherwise the current risk-free interest rate received is stored in the T_BILL variable in the storage medium 250 and processing continues at step 605.

In another embodiment, steps 603 and 604 may be replaced by a step which automatically accesses the current risk-free interest rate from the data source 130. In yet another embodiment, steps 603 and 604 may be replaced by a step which automatically accesses the current risk-free interest rate from the storage medium 350 of the server 110 which may be updated automatically by the data source 130 or manually by an administrator of the network.

At step 605, the user is prompted to input the standard deviation of the price movement related to the asset known as the "historic price volatility of the asset." The user may obtain the historic price volatility of the asset from a variety of sources, such as the data source 130. At step 606, a determination is made as to whether the historic price volatility of the asset has been received. If not, processing returns to step 605, otherwise the historic price volatility of the asset received is stored in the VOLATLTY variable in the storage medium 250 and processing continues at step 607.

In another embodiment, steps 605 and 606 may be replaced by a step which automatically accesses the historic price volatility of the asset from the data source 130. In yet another embodiment, steps 605 and 606 may be replaced by a step which automatically accesses the historic price volatility of the asset from the storage medium 350 of the server 110 which may be updated automatically by the data source 130 or manually by an administrator of the network.

At step 607, the user is prompted to input the exercise price for the particular asset. At step 608, the processing then verifies whether the exercise price of the asset has been received. If not, then the processing returns to step 607, otherwise the processing stores the exercise price of the asset received under the X_PRICE variable in the storage medium 250 and proceeds to step 609.

At step 609, the user is prompted to input the option type (either a call option or a put option). At step 610, a determination is made as to whether the option type has been received. If not, then processing returns to step 609, otherwise the option type is stored in the OPT_TYPE variable in the storage medium 250 and processing continues at step 611.

At step 611, the user is prompted to input the margin requirement (margin amount or margin percentage) related to the particular asset. The user may obtain the margin requirement from a variety of sources, such as the data source 130. At step 612, a determination is made as to whether the margin requirement for the asset has been received. If not, then processing returns to step 611, otherwise the margin requirement for the asset received is stored in the MARGIN variable in the storage medium 250 and processing continues at step 699, and then to step 510 of the CALC_E Module at FIG. 7.

In another embodiment, steps 611 and 612 may be replaced by a step which automatically accesses the margin requirement from the data source 130. In yet another embodiment, steps 611 and 612 may be replaced by a step which automatically accesses the margin requirement from the storage medium 350 of the server 110 which may be updated automatically by the data source 130 or manually by an administrator of the network.

At step 710, the user is prompted to input whether or not it wishes to determine the extinction band in percentages or in dollars. If the user selects percentages, then processing continues at step 720, otherwise processing continues at step 750.

At step 720, the user is prompted to input the percentage price movement to be used to determine the extinction band and the percentage is stored in the PERCENT variable in the storage medium 250. Processing then continues at step 725, where it determines whether the expirationless option type (OPTION_TYPE) is a "call" or a "put". If the expirationless option is a "call," then processing continues at step 730, otherwise processing continues at step 735.

At step 730, the current asset price (ASSET_PRICE) for the "call" option is set to the current asset price (ASSET_PRICE) multiplied by the value composed of the percentage price movement (PERCENT) plus one. On the other hand, at step 735, the current asset price (ASSET_PRICE) for the "put" option is set to the current asset price (ASSET_PRICE) multiplied by the value composed of the percentage price movement (PERCENT) minus one.

Processing then proceeds from step 730 or step 735 to step 775. Processing, at step 775, accesses and receives the extinction date for the particular asset (EXT_DATE) which has been set by the exchange and stored by the system administrator from the storage medium 250 or 350. Of course, the extinction date could also be manually input by the user of the present invention, who could manually input the extinction date set by the exchange each time the system is used. Processing then continues step 780.

At step 780, processing then determines the option premium for the expirationless option taking into account the extinction band by again using the option pricing algorithm selected at step 420 and setting the value of time until expiration in the algorithm to EXT_DATE. Processing then continues at step 799.

Referring back to step 710, if the user selects to use dollars to determine the extinction band, then the invention proceeds to step 750. At step 750, the user is prompted to input the minimum dollar amount price movement to be used to determine the extinction band, and the dollar amount price movement is stored in the TICK variable in the storage medium 250. At step 755, processing then sets the BAND variable to dollars.

Processing then continues at step 760, where a determination is made as to whether the expirationless option type (OPTION_TYPE) is a "call" or a "put" option. If the expirationless option is a "call," then processing continues at step 765, otherwise processing continues at step 770.

At step 765, the current asset price (ASSET_PRICE) for the "call" option is set to the current asset price (ASSET_PRICE) plus the BAND divided by the dollar amount price movement (TICK). On the other hand, at step 770, the current asset price (ASSET_PRICE) for the "put" option is set to the current price (ASSET_PRICE) minus the BAND divided by the dollar amount price movement (TICK).

Processing then continues at step 765 or step 770 to step 775. Processing continues at step 775, accesses and receives the extinction date for the particular asset (EXT_DATE) which has been set by the exchange and stored by the system administrator from the storage medium 250 or 350. Of course, the extinction date could also be manually input by the user, who could manually input the extinction date set by the exchange each time the system is used. Processing then continues at step 780.

At step 780, processing then determines the option premium for the expirationless option taking into account the extinction band by again using the option pricing algorithm selected at step 420 and setting the value of time until expiration in the algorithm to EXT_DATE. The present invention then processing continues at step 799.

At step 799, the present invention proceeds to step 440 of the Main Module at FIG. 4, where it stores the expirationless option premium under the variable OPT_PREM at the storage medium 250. At step 450, the processing may optionally complete the current financial transaction by issuing a buy or sell hard copy (ticket) to the user which includes the asset premium and other pertinent information related to the transaction.

In another embodiment, rather than issuing a buy or sell hard copy to the user, the hard copy may be issued by printing a hard copy to a buyer/seller located in the "trading pit" at the Chicago Exchange, the "desk" at the New York Exchange, or at any other similar destination of other exchanges throughout the world. Once received by a buyer/seller at an exchange, the buyer/seller may then enter the confirmation order and other information to effect the transfer of any necessary funds upon the closing of the market, as is customary. In yet another embodiment, rather than issuing a buy or sell hard copy to the user, executing the transaction may include electronically placing or transfer-ring the transaction information into a queue of a transaction server along with other transactions. When the queued transaction is removed from the queue (i.e., by an operator or by a software program), a search for a matching order is performed (e.g., if the executed transaction is a buy, the operator or software program searches for a matching sell transaction). Thus, executing an expirationless option transaction includes, but is not limited to, issuing a hard copy to the user, issuing a hard copy to a buyer/seller at the exchange, or initiating an automatic electronic transaction. The present invention anticipates the use of these and other similar methods for executing the transaction and should not be limited to any particular method.

The processing then proceeds to step 470, where the user is prompted to determine whether it wishes to transact another expirationless option. If yes, then the present invention proceeds to step 420, where the user is again prompted by the video display 220 to select an option pricing algorithm. If no, then the present invention proceeds to step 499, where it ends the expirationless option transactions for the current user.

Of note, the exemplary embodiment of the present invention assumes that, even though they may not be in actuality, the interest rates and dividend yield associated with each particular asset (e.g., a stock, bond, etc.) are zero. The reason for the assumption is that algorithms used in connection with pricing the underlying asset already factor the interest rate and dividend yield into the asset price. These algorithms may be either mathematical, inductive or both. Accordingly, the present invention for transacting an expirationless options using the same algorithms used for expiring options factors the interest rate and dividend yield into the option premium, but at a value of zero to ensure both the call and the put option at S=X have a price equal to the margin requirement.

The following examples illustrate the time/cost relationship between expiring options, premiums, expirationless options and margin requirements. Both examples assume a margin requirement of 25%, a current asset price of 150, a historic price volatility of 35%, and a current risk-free interest rate of 6%. Thus, using Black-Scholes algorithm, an implied time of 1210.09 days is derived.

The first example assumes a call option with an exercise price of $60 is requested by the investor.

| Time to Expiration | Expiring Option Premium | Expirationless Option Premium | Margin Requirement |
|---|---|---|---|
| Six Months | $2.15 | $9.29 | $12.5 |
| One Year | 4.59 | 9.29 | 12.5 |
| Eighteen Months | 6.65 | 9.29 | 12.5 |
| Two Years | 8.56 | 9.29 | 12.5 |
| Three Years | 11.87 | 9.29 | 12.5 |
| Five Years | 16.63 | 9.29 | 12.5 |
| Ten Years | $27.04 | $9.29 | $12.5 |

The second example assumes a put option with an exercise price of $40 is requested by the investor.

| Time to Expiration | Expiring Option Premium | Expirationless Option Premium | Margin Requirement |
|---|---|---|---|
| Six Months | 0.85 | 6.91 | 12.5 |
| One Year | 1.78 | 6.91 | 12.5 |
| Eighteen Months | 2.45 | 6.91 | 12.5 |
| Two Years | 2.96 | 6.91 | 12.5 |
| Three Years | 3.66 | 6.91 | 12.5 |
| Five Years | 4.29 | 6.91 | 12.5 |
| Ten Years | 4.45 | 6.91 | 12.5 |

In another embodiment, the method of the current invention may be utilized to calculate an expirationless option premium using a simplified form of an expiring option algorithm. Typical option pricing calculations require not just a life expectancy of an expirationless option, but a volatility assumption over the life of the option as well. This would seem to be impossible over the undetermined time frame of the expirationless option. However, if the security price already contains an interest rate assumption, we can express the volatility portion of the Black-Scholes algorithm in terms of the current price. If we know the expirationless put and call must be equal in price, then we can solve for an implied time to expiration at S=X; and use this implied time to solve for option prices at exercise prices other than the current security price.

For an expirationless option, the Black-Scholes formula takes the form:

$$C = e^{-dt} S N(d1) - E e^{-rt} N(d2)$$

Where:

C=Option Premium
S=Current stock price
E=Option exercise price
T=Time to expiration
d=Dividend yield
r=Riskfree interest rate
v=Stock volatility
$d1 = [\ln(S/E) + (r - d + 0.5v^2)T]/v \, SQRT(T)$
$d2 = d1 - v SQRT(T)$ The expirationless call option price can be calculated by setting dividends and the risk-free rate to zero, and setting the exercise price equal to the stock price. An expirationless option can be calculated under any set of assumptions concerning the distribution of prices of the underlying security. This method assumes a log normal price distribution. It is then possible to calculate the time for which the call price=the put price=0.5S. It should be clear that S is the lowest price to buy the security in the open market. In effect this will be the lower of the actual price or the margin requirement.

The Black-Scholes formula reduces to the following. Note that N is the cumulative normal distribution while NINV is the inverse cumulative normal distribution. Also, the call price=the put price=0.5 S, and is referred to as the variable Margin.

$$C = 0.5S = S N(d1) - S N(d2)$$

$$0.5 = N(d1) - N(d2)$$

$$d1 = \ln(S/S) + (0 - 0 + 0.5v^2)T/vSQRT(T) -$$
$$.5v^2T/vSQRT(T) * SQRT(T)$$
$$= (0.5v^2T\ SQRT(T))/vT$$
$$= .5vSQRT(T)$$

$$d2 = d1 - vSQRT(T)$$
$$= .5vSQRT(T) - vSQRT(T)$$
$$= -.5vSQRT(T)$$

Since:

$$\text{Margin} = N(0.5V\ SQRT(T)) - N(-0.5V\ SQRT(T))$$

And N(0.5v SQRT(T) and N(−0.5v SQRT(T)) are opposing numbers around zero, then $$\text{Margin}/2 = N(0.5v\ SQRT(T))$$

$$NINV\ (\text{Margin}/2) = 0.5V\ SQRT(T)$$

$$NINV\ (\text{Margin}/2)/0.5v = SQRT(T)$$

$$(NINV\ (\text{Margin}/2)0.5v))^2 = T$$

Now that time is purely a function of volatility it can be applied back to the Black-Scholes formula as follows:
Allowing x=2 NINV (Margin/2) and T=$(x/v)^2 = x^2/v^2$ $$D1 = [\ln(S/E) + .5v^2T]/vSQRT(T)$$
$$= \ln(S/E) + .5v^2(x^2/v^2))/vSQRT((x/v)^2)$$
$$= (\ln(S/E) + .5x^2)/x$$
$$= \ln(S/E)/x + .5x$$

$$D2 = D1 - v(SQRT(T))$$
$$= d1 - vSQRT((x/v)^2)$$
$$= d1 - x$$
$$= \ln(S/E)/x - .5x$$

From the equation above for the expirationless option we apply d1 and d2.

$$EPO = C = SN(\ln(S/E)/x + 0.5x) - EN(\ln(S/E)/x - 0.5x)$$

Therefore, the expirationless option premium can be calculated purely as a function of the stock price and the exercise price and x, where x=2 NINV (Margin/2).

In yet another embodiment, the method of the present invention may be utilized to calculate an expirationless option premium which may then, in turn, be utilized as a basis to determine a premium for a conventional expiring option. Previous methods for pricing expiring options have considered the maximum price of an expiring option to be the price of the underlying security. However, the maximum price of an expiring option is actually not the price of the underlying security, but is instead the price of an otherwise identical expirationless option. Accordingly, by utilizing the value for an expirationless option as determined under the present invention, the price of a traditional expiring option can be more accurately calculated. The method for determining an expiring option price utilizing an expirationless option premium determined according to the method of the present invention proceeds generally as follows. First, data representative of the particular asset underlying the expiring option, the option type (call or put), an exercise price for the option, the current price of the particular asset underlying the option, the historic price volatility of the particular asset and the margin requirement for the particular asset are input at step. Then, the current price of the underlying security is used as the expiration price to solve an expiring option equation (such as the Black-Scholes, the Binomial Pricing, the Finite Difference and the Analytic Approximation algorithms) for an implied time to expiration. Next, the implied time to expiration is used as the basis for calculating the price for the corresponding expirationless option. The expirationless option price is then used as the maximum price of the corresponding expiring option in determining the premium for the expiring option.

In regards to an expirationless option, the present invention includes any contingent claim upon the assets, promise of payment, equity, production units or currency of any group, organization, body, institution or collective over any measure of time and any measure of value, regardless of whether the claim has an artificial minimum (floor) or maximum (cap), regardless of whether the claim is contingent upon unforeseeable or controllable action, regardless of whether the claim is called by an other name, or is characterized as any product, issue or promise which can be demonstrated to be an individual or series of options, regardless of their life span The art has and continues to maintain that the maximum value of any expiring option is the underlying product, and that such maximum value is a determinant in pricing said option, when such statements are clearly false given that expirationless options exist, since the maximum value of any expiring option is an otherwise identical nonexpiring option. Given that we have a priority claim on nonexpiring options, whose value or price is an integral component of correctly pricing expiring options, our claim is expanded to cover not only expiring options, but any financial product which can be demonstrated to be an individual or series of options.

Expirationless options calculated according to the method of the present invention may also be used in constructing any combination or permutation of expiring options currently used. For example, these options may include but are not limited to:

Asian options: average price/rate and strike options.
Barrier options: including knock-out or knock-in, with and without rebate.
Binary options: including binary barrier, all-or-none and gap.
Chooser options: which are options to choose a put or call in the future.
Compound options: which are options where the underlying security is an option.
Crack/Spread options: which are options on the distance between prices of two assets.
Currency Translated options: which are foreign exchange options translated into another currency.
Jump options: which are options priced using a jump-diffusion process.
Lookback options: which are options based on minimum or maximum price within a certain period.
Rainbow options: which are options on the minimum or maximum of two assets.

Other miscellaneous options: such as options on U.S. or foreign "stripped" government securities divided into two or more instruments of principal and interest or price and dividend, likewise options on stripped corporate, agency, and municipal securities, notes, bills and Certificates of Deposit; options on Callables, which are securities callable at premium or discount; options on Odd-First, -Last, -Middle, or securities with varying coupon/dividend periods; and Options on Futures, Forwards, Currencies, Commodities, Swaps, Debt, Metals, Indices or any other financial instrument not detailed here.

Even though the present invention has been described substantially in terms of utilizing the margin requirement of a margin position in the securities market, equivalents to the margin requirement in other markets (e.g., earnest money in the real estate market) may be utilized. Further, even though an exemplary embodiment of the present invention is described assuming that the margin requirement on the underlying security is equal for both the long and short positions, this need not be the case. Specifically, even in cases where the margin position requirements are different, it should be obvious to one of the ordinary skill in the art that the present invention can be used to determine the expirationless option premiums comprising each respective position by using the long position margin requirement for purchasing expirationless call options and selling expirationless put options, while using the short position margin requirement for purchasing expirationless put options and selling expirationless call options.

Furthermore, a variety of other financial instruments have been shown to be equivalent or relatable to options. Therefore, the premiums of each of these financial instruments may be determined utilizing an expiring or expirationless option premium determined according to the method of the present invention. Examples of these option relatable financial instruments, provided for example and not limitation, include:

Equity: Ownership of a corporation is actually a contingent claim on the assets of the corporation that does not expire and only occurs at a zero strike price. Thus, equity can be considered to be an option.

Bonds, Loans, Private Placements: These fixed-income instruments are identical to an individual or series of cash-settled, "capped" call options—a call option with a maximum benefit. These options are purchased with the expectation that the issuer will remain a viable, profitable entity. However, the maximum return on the call is "capped" at some amount (the coupon payment and principal payment at the end of the period). One capped option represents each coupon payment as well as the principal or notional value repaid. Fixed income instruments may take one of the following forms:

Zero Coupon: One payment of principal at end of term.

Floating Rate Coupon: One principal payment at end of term and coupon payments calculated based on an interest rate calculated from some external benchmark (90-day Treasury, 90-day LIBOR, etc.)

Level Coupon: One principal payment at end of term and coupon payments based on an interest rate agreed at the start of the term.

Amortizing: No principal payment is made during the term of the loan; the principal is repaid over the term as part of the coupon payments.

Forward Contracts: A forward contract obligates its owner to buy a given asset on a specified date at a price (also known as the exercise price) specified at the origination of the contract This is identical to a combination of a long call option combined with a short put option or vice versa.

Futures Contracts: Identical to forward, but typically traded on an exchange where default risk is eliminated by the exchange's guarantee of performance.

Swaps: Two parties exchange ("swap") specified cash flows at specified intervals, typically "fixed for floating" or vice versa. A swap contract is really nothing more than a series of forward contracts.

Forward Swap/Delayed Start Swap: A combination of a forward contract and a swap.

Break Forwards: A forward contract with a floor (or a cap) in which the contract terminates early if prices fall (rise) to a certain level.

Straddles/Strangles/Butterflies: Option combinations that provide differing payoffs based on price movements, typically combinations of puts and calls either both long or both short.

Reverse Floating Rate Loan/Bull Floating Rate Notes: If the floating rate rises, the net coupon payment falls.

Dual Currency Bond: Combination of a standard credit extension with a forward currency contract.

Callable/Puttable Bonds: Standard bond and option on interest rates. Extendible Notes: Long a standard bond and short a call option (issuer).

Puttable Stock: Stock issued with puts for investors to acquire more if the price falls.

Bond w/Warrant: Level coupon bond and an option on shares of the issuing firm.

Convertible Bond: Bond convertible into shares of the issuing firm.

LYON (Liquid Yield Option Notes): Puttable, callable, convertible, zero coupon bonds.

Commodity-Linked Bonds: A bond with interest payments linked to some commodity. Examples include:

Oil-Indexed Notes: Standard note and options on crude oil.

Copper Interest-Indexed Senior Subordinated Notes: Note with quarterly interest payments determined by the prevailing price of copper.

Auction Rate Notes/Debentures: Interest rate reset by Dutch auction at the end of each interest period.

Collaterallized Mortgage Obligations (CMOs)/Real Estate Mortgage Investment Conduits (REMICs): Mortgage payment stream divided into classes prioritized by rights to receive principal payments.

Commercial Real-Estate Backed Bonds: Nonrecourse bonds serviced and backed by a specified piece of real estate.

Credit Enhanced Debt Securities: Issuer's obligation to pay is backed by an irrevocable letter of credit or a surety bond.

Dollar BILS: Floating zero coupon notes with interest rates figured retrospectively on an index of long-term high-grade corporate bonds.

Foreign Exchange Paper: Commercial paper on foreign companies, usually those operating under a single currency.

Floating/Bate Sensitive Notes: Coupon rate resets on spread over T-Bill, LIBOR, etc.

Floating Rate Tax-Exempt Revenue Bonds: Coupon rate floats with index (commercial paper, etc.).

Increasing Rate Notes: Coupon rate note increases by specified amount at specified intervals.

Indexed Currency Option Notes or Principal Exchange Rate Linked Securities: Issuer pays reduced/increased principal based on appreciation/depreciation of foreign currency.

Caps/Floors/Collars: Investor who writes a cap (floor/collar) agrees to make payments when the underlying exceeds the cap (falls below the floor/outside the collar) or vice versa.

Interest Rate Reset Notes: Rate is reset after issuance to initial rate or some preset rate.

Mortgage Pass-Through Certificates: Undivided interest in a pool of mortgages.

Negotiable Certificates of Deposit: Registered CDs sold on an agency basis.

Adjustable Tender Securities: issuer can periodically reset Terms.

Puttable/Extendable Notes: At each period, issuer can redeem notes at par or extend maturity, notes can be put back to issuer at option of purchaser.

Real Yield Securities: Coupon rate resets quarterly, typically to the Real Yield Spread plus some fixed amount.

Receivable Pay-Through Securities: Undivided interest in a pool of receivables.

Remarketed Reset Notes: Interest rate resets at end of each period to a rate remarketing agent determines will make the notes worth par.

Stripped Mortgage Backed Securities: Coupon payments divided into interest only and principal only payments to investors.

Stripped Treasuries/Municipals: Divided into coupon & principal (creates zero coupon bonds).

Variable Coupon Renewable Notes: Coupon rate varies based on T-Bill, renews every 90 days unless terminated.

Variable Rate Renewable Notes: Coupon rate varies monthly until investor terminates.

Yield Curve/Maximum Rate Notes: Rate is specified at level minus LIBOR (or other standard index/yield).

Adjustable Rate Preferred Stock: Dividend rate resets based on index/yield.

Auction Rate Preferred Stock: Dividend rate resets by Dutch auction at regular intervals.

Convertible Adjustable Preferred Stock: Convertible into common stock at certain dates under certain conditions.

Remarketed Preferred Stock (SABRES): Dividend rate resets at the regular intervals to a rate set by the marketing agent to make the preferred stock worth par.

Single Point Adjustable Rate Stock: Dividend rate reset regularly as a fixed percentage of some index/yield.

State Rate Auction Preferred Stock: Fixed initial dividend period followed by the issuer's option to convert to a reset by Dutch auction at periodic intervals.

Variable Cumulative Preferred Stock: Dividend rate reset at issuer's option to either auction or remarketing method.

Adjustable Rate Convertible Debt: Interest rate varies directly with the underlying common stock dividend rate.

Convertible Exchangeable Preferred Stock: Convertible preferred stock exchangeable at issuer's option for debt with identical rate and conversion terms.

Convertible Reset Debentures: Convertible bond with interest rate reset at a predetermined time to an amount sufficient to give debentures a market value equal to their face amount.

Debt with Mandatory Common Stock Purchase Contracts: Notes that obligate purchasers to buy sufficient stock from the issuer to retire the issue in full by the scheduled maturity date.

Exchangeable Preferred Stock: Auction rate preferred stock exchanged for auction rate notes.

Synthetic Convertible Debt: Debt and warrants replicating convertible debt.

Zero Coupon Convertible Debt: Non-interest bearing convertible debt.

Puttable Common Stock: Issue of common stock with the right to put the stock back to the issuer on a specified date at specified price.

Although the present invention has been described in various embodiments and the various embodiments have been provided as examples of implementations of the present invention. It should be understood that the present invention is not limited to any particular shape, size, embodiment or configuration. On the contrary, the aspects of the present invention can be embodied in various manners within the scope and spirit of the invention as described herein.

What is claimed is:

1. A computer implemented method for valuing an instrument, comprising:
   receiving data associated with a financial instrument;
   processing the data using a processor to determine an expirationless option value for the financial instrument using an expirationless option, the expirationless option value being less than an underlying asset value of the instrument; and
   computing a value for the financial instrument using the expirationless option value instead of the underlying asset value in an option pricing algorithm.

2. The method of claim 1 wherein said instrument provides for the optional sale or purchase of an underlying asset at a predetermined non-zero price.

3. The method of claim 1 wherein processing the data to determine an expirationless option value for the financial instrument comprises using a pricing algorithm selected from the group of:
   Merton, Black-Scholes, Binomial Pricing, Finite Difference, and Analytic Approximation algorithms.

4. The method of claim 1 wherein said expiring option is selected from the list composed of: vanilla options; asian options; barrier options; binary options; chooser options; compound options; crack/spread options; currency translated options; jump options; rainbow options; Average Rate Option; Exchange One Asset for Another Option; Quanto Option; average price Asian option; European (American) lookback option; contingent premium option; down-and-in barrier option; up-and-in barrier option; cash-or-nothing binary option; gap option; one-touch cash-at-hit option; Asset-at-hit option; one-touch cash-at-expiration option; asset-at-expiration option; double barrier kick-in option; double barrier knock-out option; double baffler no-touch option; double barrier one-touch cash-at-hit option; double baffler one-touch cash-at-expiration option; double-barrier one-touch asset at hit option; double-barrier one-touch asset at expiration option; asset-or-nothing up-and-in digital baffler option; asset-or-nothing up-and-out digital barrier option; asset-or-nothing down-and-in digital baffler option; asset-or-nothing up-and-in digital baffler option; cash-or-nothing up-and-in digital baffler option; cash-or-nothing up-and-out digital baffler option; cash-or-nothing down-and-in digital baffler option; cash-or-nothing down-and-in options; cash-or-nothing up-and-in options; basket option;

two-item basket option; generalized basket option; maximum of two option; minimum of two option; European (American) spread option; correlation gap option; complex chooser option; cliquet option; forward start option; Bermudan option; swing option; shout option; options on U.S. or foreign "stripped" government securities divided into two or more instruments of principal and interest or price and dividend; options on stripped corporate, agency, and municipal securities, notes, bills and certificates of deposit; options on callables; and options on odd-first, -last, -middle, or securities with varying coupon/dividend periods, varying strike prices of varying underlying instruments.

5. The method of claim 1, wherein processing the data to determine an expirationless option value for the financial instrument using an expirationless option comprises:
   receiving data associated with an underlying asset including, a current price, a historic volatility and a margin requirement;
   using the current price as an expiration price in an expiring option algorithm to determine an implied time to expiration; and
   using the implied time to expiration to determine the price of an expirationless option.

6. The method of claim 1 wherein processing the data to determine a premium for an expiring option using the expirationless option value as a maximum value of the expiring option comprises using the expirationless option value as a maximum price in an expiring option algorithm.

7. The method of claim 1 further comprising displaying the premium to a user.

8. A system for valuing an instrument, comprising:
   a processing unit;
   a memory storage device;
   an input interface for receiving data associated with an option and an underlying asset value of the option, the underlying asset value corresponding to an underlying asset;
   a program module, stored in the memory storage device for providing instructions to the processing unit; and
   wherein the processing unit, responsive to the instruction of the program module, determines an expirationless option value for the instrument using an expirationless pricing algorithm, the expirationless option value being less than the underlying asset value, and
   wherein the processing unit determines a value for the instrument using the expirationless option value instead of the underlying asset value in an option pricing algorithm.

9. The system of claim 8 wherein said program module is operative to enable a transaction including a purchase, sale or trade of an option to purchase, sell or trade said underlying asset utilizing said option of the premium.

10. An article, comprising a storage medium, said storage medium having stored thereon instructions, said instructions, when executed, to determine a value for an expiring instrument, comprising:
    determining an expirationless option value for the expiring instrument using an expirationless pricing algorithm, wherein said expirationless option value is less than an underlying asset value of the expiring instrument; and
    using the expirationless option value in an expiring pricing algorithm to determine a value for the expiring instrument, wherein the expirationless option value is used instead of an underlying asset value to determine the value for the expiring instrument.

11. A computer implemented method to determine a value for a financial instrument comprising:
    receiving financial instrument data associated with an expiring option contract data for the optional sale or purchase of an underlying asset granting an owner of the contract a right, but not an obligation, to sell or buy said underlying asset at a predetermined non-zero price;
    processing the expiring contract data using a processor to determine the value for the financial instrument; and
    providing the determined value to a user;
    wherein the expirationless option value is less than an underlying asset value of the expiring contract, and wherein the expirationless option value is used to process the contract data instead of the underlying asset value in an option pricing algorithm to determine the value for the financial instrument.

* * * * *